United States Patent
Kim et al.

(10) Patent No.: US 11,818,078 B2
(45) Date of Patent: *Nov. 14, 2023

(54) METHOD FOR PERFORMING SIDELINK COMMUNICATION AND DEVICE THEREFOR

(71) Applicant: IUCF-HYU (INDUSTRY-UNIVERSITY COOPERATION FOUNDATION HANYANG UNIVERSITY), Seoul (KR)

(72) Inventors: Sun Woo Kim, Seoul (KR); Seong Jin Kim, Seoul (KR); Min Soo Jeong, Seoul (KR); Hyeon Jin Chung, Seoul (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/933,842

(22) Filed: Sep. 20, 2022

(65) Prior Publication Data

US 2023/0018483 A1 Jan. 19, 2023

Related U.S. Application Data

(63) Continuation of application No. 16/972,377, filed as application No. PCT/KR2020/004870 on Apr. 10, 2020, now Pat. No. 11,489,650.

(30) Foreign Application Priority Data

Apr. 12, 2019 (KR) .................. 10-2019-0043200
Apr. 12, 2019 (KR) .................. 10-2019-0043283

(Continued)

(51) Int. Cl.
*H04L 5/00* (2006.01)
*H04W 76/14* (2018.01)
(Continued)

(52) U.S. Cl.
CPC .......... *H04L 5/0092* (2013.01); *H04L 1/1812* (2013.01); *H04L 1/1861* (2013.01);
(Continued)

(58) Field of Classification Search
CPC ... H04L 5/0092; H04L 1/1812; H04L 1/1861; H04L 5/0051; H04L 5/06; H04L 27/2607;
(Continued)

(56) References Cited

U.S. PATENT DOCUMENTS

2018/0062809 A1 3/2018 Baghel et al.
2020/0275458 A1* 8/2020 Khoryaev .............. H04W 4/44
(Continued)

FOREIGN PATENT DOCUMENTS

KR 10-2018-0107995 A 10/2018
WO 2018-031061 A1 2/2018

OTHER PUBLICATIONS

Samsung, 'Feature lead summary for agenda item 7.2.4.1 Physical layer structure for sidelink', R1-1905665, 3GPP TSG RAN WG1 #96bis Meeting, Xi'an, China, Apr. 9, 2019 pp. 5, 9, 20.
(Continued)

*Primary Examiner* — Chae S Lee

(57) ABSTRACT

The present disclosure relates to a method and device for providing a V2X service in a next generation radio access technology (new RAT). The present embodiments may provide a method and device for performing sidelink communication by a transmission terminal, the method comprising the steps of: receiving, from a base station, one or more pieces of DMRS pattern information and a resource information set comprising information about one or more side-
(Continued)

link resources; selecting, on the basis of the resource information set, one sidelink resource for performing sidelink communication; selecting, on the basis of the selected one sidelink resource, a particular DMRS pattern from among the one or more pieces of DMRS pattern information; and transmitting a PSCCH and a PSSCH in one slot by using the selected sidelink resource, and transmitting, on the basis of the particular DMRS pattern, a DMRS from a particular symbol of the PSSCH.

12 Claims, 21 Drawing Sheets

(30) Foreign Application Priority Data

| | | |
|---|---|---|
| Jun. 27, 2019 | (KR) | 10-2019-0077361 |
| Nov. 29, 2019 | (KR) | 10-2019-0156725 |
| Apr. 7, 2020 | (KR) | 10-2020-0042169 |

(51) Int. Cl.

| | |
|---|---|
| *H04L 5/06* | (2006.01) |
| *H04L 27/26* | (2006.01) |
| *H04W 56/00* | (2009.01) |
| *H04W 72/02* | (2009.01) |
| *H04W 72/0446* | (2023.01) |
| *H04W 72/1263* | (2023.01) |
| *H04L 1/1812* | (2023.01) |
| *H04L 1/1829* | (2023.01) |
| *H04W 72/20* | (2023.01) |
| *H04W 4/40* | (2018.01) |
| *H04W 92/18* | (2009.01) |

(52) U.S. Cl.
CPC .............. *H04L 5/0051* (2013.01); *H04L 5/06* (2013.01); *H04L 27/2607* (2013.01); *H04W 56/0015* (2013.01); *H04W 72/02* (2013.01); *H04W 72/0446* (2013.01); *H04W 72/1263* (2013.01); *H04W 72/20* (2023.01); *H04W 76/14* (2018.02); *H04W 4/40* (2018.02); *H04W 92/18* (2013.01)

(58) Field of Classification Search
CPC ... H04L 5/0082; H04L 5/0064; H04L 5/0091; H04L 5/001; H04L 5/0023; H04L 5/0048; H04L 27/26025; H04L 27/2613; H04L 5/0007; H04L 5/0055; H04L 27/2666; H04W 56/0015; H04W 72/02; H04W 72/0406; H04W 72/0446; H04W 72/1263; H04W 76/14; H04W 4/40; H04W 92/18; H04W 4/023; H04W 4/70; H04W 56/00; H04W 72/04; H04W 72/1278; H04W 74/08

See application file for complete search history.

(56) References Cited

U.S. PATENT DOCUMENTS

| | | | |
|---|---|---|---|
| 2020/0313825 A1* | 10/2020 | Ryu | H04L 5/0051 |
| 2020/0314804 A1* | 10/2020 | Shin | H04W 24/10 |
| 2021/0250931 A1 | 8/2021 | Yang | |

OTHER PUBLICATIONS

Huawei, 'Sidelink reference signal design for NR V2X', R1-1903945, 3GPP TSG RAN WG1 Meeting #96bis, Xi'an, China, Apr. 2, 2019 See sections 2.1.

International Search Report issued in PCT Application No. PCT/KR2020/004870, dated Jul. 10, 2020.

* cited by examiner

FIG.9
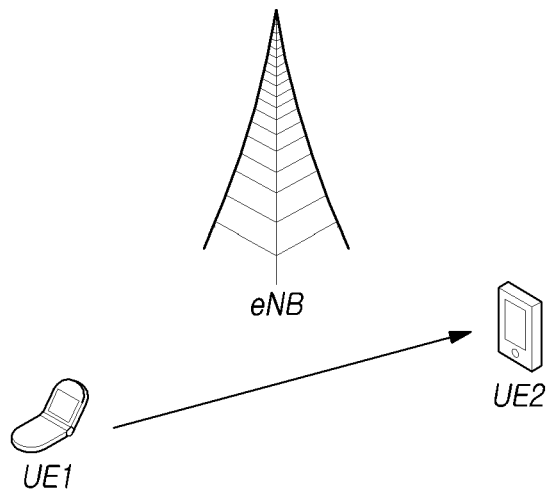
(a)
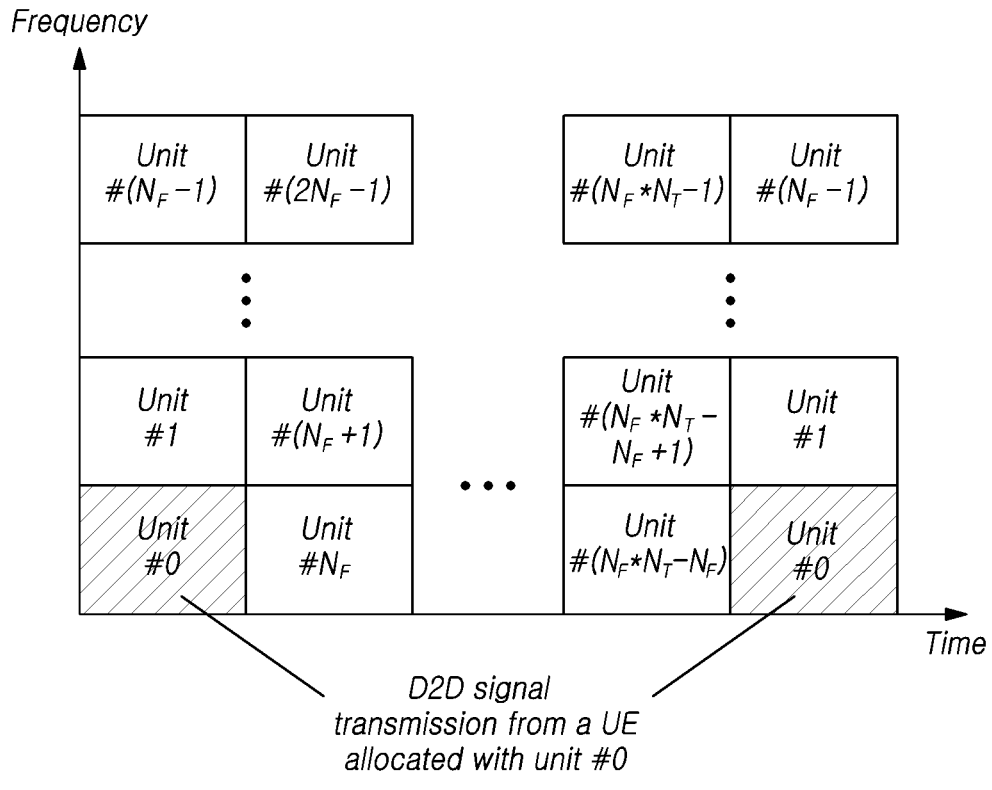
(b)

FIG.14

| SCI field | Bit |
|---|---|
| Priority | 3 bits |
| Frequency resource assignment | Variable |
| Time resource assignment | 5 bits |
| Resource reservation period | Variable |
| DMRS pattern | X bits |
| $2^{nd}$-stage SCI format | Y bits |
| Beta_offset indicator | 2 bits |
| Number of DMRS port | 1 bit |
| Modulation and coding scheme | 5 bits |

FIG.20

| $L_d$ | DM-RS position $L$ |||||||
|---|---|---|---|---|---|---|---|
| | PSCCH duration 2 symbols |||| PSCCH duration 3 symbols |||
| | Number of PSSCH DM-RS |||| Number of PSSCH DM-RS |||
| | 2 | 3 | 4 | 2 | 3 | 4 |
| 6 | 1,5 | | | 1,5 | | |
| 7 | 1,5 | | | 1,5 | | |
| 8 | 1,5 | | | 1,5 | | |
| 9 | 3,8 | 1,4,7 | | 4,8 | 1,4,7 | |
| 10 | 3,8 | 1,4,7 | | 4,8 | 1,4,7 | |
| 11 | 3,10 | 1,5,9 | 1,4,7,10 | 4,10 | 1,5,9 | 1,4,7,10 |
| 12 | 3,10 | 1,5,9 | 1,4,7,10 | 4,10 | 1,5,9 | 1,4,7,10 |
| 13 | 3,10 | 1,6,11 | 1,4,7,10 | 4,10 | 1,6,11 | 1,4,7,10 |

METHOD FOR PERFORMING SIDELINK COMMUNICATION AND DEVICE THEREFOR

CROSS-REFERENCE TO RELATED APPLICATIONS

This application is a continuation of U.S. application Ser. No. 16/972,377 filed on Dec. 4, 2020, which is a National Stage Entry of PCT International Application No. PCT/KR2020/004870, which was filed on Apr. 10, 2020, and which claims priority from and the benefit of Korean Patent Application Nos. 10-2019-0043200, filed with the Korean Intellectual Property Office on Apr. 12, 2019, 10-2019-0043283 filed with the Korean Intellectual Property Office on Apr. 12, 2019, 10-2019-0077361 filed with the Korean Intellectual Property Office on Jun. 27, 2019, 10-2019-0156725 filed with the Korean Intellectual Property Office on Nov. 29, 2019, 10-2020-0042169 filed with the Korean Intellectual Property Office on Apr. 7, 2020, all of which are hereby incorporated by reference for all purposes as if fully set forth herein. In addition, when this application also claims priority for countries other than the United States for the same reason as above, all of the contents of the above-listed applications are hereby incorporated by reference.

TECHNICAL FIELD

The present disclosure relates to a method and device for providing a vehicle-to-everything (V2X) service in next generation wireless access network (New RAT).

BACKGROUND ART

There is demand for high-capacity data processing, high-speed data processing, and a variety of services using a wireless terminal in vehicles, industrial sites, and the like. In this manner, there is demand for technology for high-speed and high-capacity telecommunications systems grown out of simple voice-centric services and able to process a variety of scenarios and high-capacity data, such as images, wireless data, machine-type communication data, and the like.

In this regard, the ITU radiocommunication sector (ITU-R) discloses requirements for the adaptation of international mobile telecommunications-2020 (IMT-2020) international standards. Research into next-generation wireless communication technology for meeting IMT-2020 requirements is underway.

In particular, in the 3rd generation partnership project (3GPP), research into LTE-Advanced Pro Rel-15/16 standards and new radio access technology (NR) standards is underway in order to meet IMT-2020 requirements referred to as 5G technology requirements. The two standard technologies are planned to be approved as next-generation wireless communication technologies.

5G technology may be applied to and used in autonomous vehicles. In this regard, 5G technology needs to be applied to vehicle-to-everything (V2X). For autonomous driving, it is necessary to transmit and receive increasing amounts of data at high speeds with high reliability.

In addition, both unicast data transmission and reception and multicast data transmission and reception using vehicle communications must be provided in order to meet driving scenarios, such as platooning, of a variety of autonomous vehicles. In such a situation, there is a demand for the development of technology able to provide high-reliability data transmission and reception in vehicle communications.

DISCLOSURE

Technical Problem

Embodiments of the present disclosure may provide a method and device for performing sidelink communications using next-generation wireless access technology.

Technical Solution

According to an aspect, embodiments of the present disclosure may provide a method of performing sidelink communication by a transmitting terminal. The method may include: receiving information regarding one or more DMRS patterns and a resource information set including information regarding one or more sidelink resources from a base station; selecting a single sidelink resource for performing sidelink communication in accordance with the resource information set; selecting a predetermined demodulation reference signal (DMRS) pattern from the information regarding one or more DMRS patterns in accordance with the selected sidelink resource; and transmitting a physical sidelink control channel (PSCCH) and a physical sidelink shared channel (PSSCH) in a single slot using the selected sidelink resource and transmitting a DMRS in a predetermined symbol of the PSSCH in accordance with the predetermined DMRS pattern.

According to another aspect, embodiments of the present disclosure may provide a method of performing sidelink communication by a receiving terminal. The method may include: receiving information regarding one or more DMRS patterns and a resource information set including information regarding one or more sidelink resources from a base station; receiving a PSCCH via a single sidelink resource selected by a transmitting terminal; reviewing scheduling information of a PSSCH and information regarding a predetermined DMRS pattern received by being included in the PSSCH, in accordance with the PSCCH; and receiving a DMRS in a predetermined symbol of the PSSCH in accordance with the information regarding a predetermined DMRS pattern.

According to a further aspect, embodiments of the present disclosure may provide a transmitting terminal performing sidelink communication, The transmitting terminal may include: a receiver receiving information regarding one or more DMRS patterns and a resource information set including information regarding one or more sidelink resources from a base station; a controller selecting a single sidelink resource for performing sidelink communication in accordance with the resource information set and selecting a predetermined DMRS pattern from the information regarding one or more DMRS patterns in accordance with the selected sidelink resource; and a transmitter transmitting a PSCCH and a PSSCH in a single slot using the selected sidelink resource and transmitting a DMRS in a predetermined symbol of the PSSCH in accordance with the predetermined DMRS pattern.

Advantageous Effects

According to embodiments of the present disclosure, the method and device for performing sidelink communications using next-generation wireless access technology may be provided.

DESCRIPTION OF DRAWINGS

FIGS. 9a and 9b illustrate an example of terminals (UE1, UE1) performing sidelink communications and an example of a sidelink resource pool used by the terminals;

FIG. 14 is a diagram illustrating sidelink control information fields according to an embodiment;

FIG. 20 is a diagram illustrating a method of determining DMRS allocation symbols according to an embodiment.

BEST MODE

Figure 1:
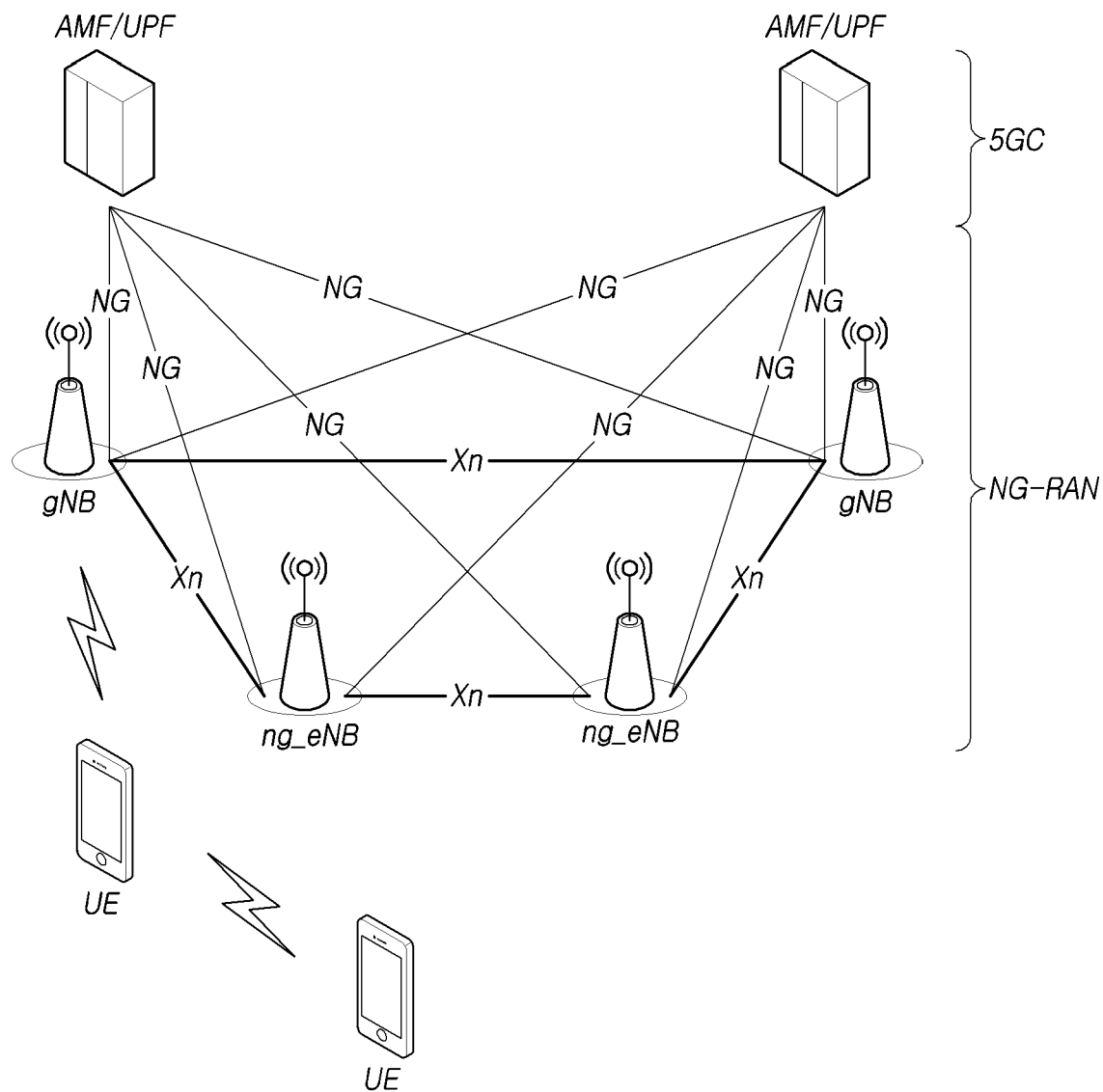
FIG. 1 is a diagram schematically illustrating a structure of an NR wireless communications system to which embodiments are applicable.

Hereinafter, some embodiments of the present disclosure will be described in detail with reference to the accompanying illustrative drawings. In designating elements of the drawings by reference numerals, the same elements will be designated by the same reference numerals although being shown in different drawings. Further, in the following description of the present disclosure, detailed descriptions of known functions and configurations incorporated herein will be omitted in the situation in which the subject matter of the present disclosure may be rendered rather unclear thereby. Terms such as "including", "having", "containing", "constituting", "make up of", and "formed of" as used herein are generally intended to allow other components to be added unless the terms are used with the term "only". As used herein, singular forms are intended to include plural forms unless the context clearly indicates otherwise.

In addition, terms, such as first, second, A, B, (a), (b) or the like may be used herein when describing components of the present disclosure. These terminologies are not used to define an essence, order, sequence, or number of corresponding components but used merely to distinguish the corresponding components from other components.

In the case that it is described that two or more elements are "connected", "coupled", or "linked" to each other, such wording should be interpreted as meaning the two or more elements may not only be directly "connected", "coupled", or "linked" to each other but also be "connected", "coupled", or "linked" to each other via another "intervening" element. Here, the other element may be included in one or more of the two or more elements "connected", "coupled", or "linked" to each other.

When temporally relative terms, such as "after", "subsequent to", "next", "before", and the like, are used to describe processes or operations of elements or configurations, or flows or steps in operating, processing, or manufacturing methods, these terms may be used to describe non-consecutive or non-sequential processes or operations unless the term "directly" or "immediately" is used together.

In addition, when any dimensions, relative sizes, etc. are mentioned, it should be considered that numerical values for elements or features, or corresponding information (e.g. level, range, etc.) include a tolerance or error range that may be caused by various factors (e.g. process factors, internal or external impacts, noise, etc.) even when a relevant description is not specified.

The term "wireless communications system" used herein refers to a system providing a range of communication services, including voice and packet data, using radio resources (or wireless resources). Such a wireless communications system may include a terminal (or user equipment), a base station, a core network, and the like.

Embodiments disclosed hereinafter may be used in wireless communications systems using a range of wireless access technologies. For example, embodiments may be used in a range of wireless access technologies, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). In addition, wireless access technologies may mean not only specific access technologies but also communications technologies according to the generation, established by a variety of communications consultative organizations, such as the 3rd generation partnership project (3GPP), the 3rd generation partnership project 2 (3GPP2), the Wi-Fi alliance, the Bluetooth, the institute of electrical and electronics engineers (IEEE), and the international telecommunication union (ITU). For example, CDMA may be realized by a wireless technology, such as universal terrestrial radio access (UTRA) or CDMA2000. TDMA may be realized by a wireless technology, such as the global system for mobile communications (GSM), General Packet Radio Service (GPRS), or enhanced data rates for GSM evolution (EDGE). OFDMA may be realized by a wireless technology, such as IEEE802.11 (Wi-Fi), IEEE 802.16 (WiMAX), IEEE 802-20, or evolved-UMTS terrestrial radio access (E-UTRA, where UMTS denotes the universal mobile telecommunications system). IEEE 802.16m, evolved from IEEE 802.16e, provides backward compatibility with systems based on IEEE 802.16e. UTRA is a portion of UMTS. 3rd generation partnership project (LTE) long term evolution (3GPP) is a portion of evolved UMTS (E-UMTS) using E-UTRA, and uses OFDMA in downlinks and SC-FDMA in uplinks. In this manner, embodiments of the present disclosure may be used in wireless access technologies that are currently disclosed or commercially available, or may be used in any wireless access technology currently being, or which will be, developed.

In addition, the term "terminal" used herein should be interpreted as having a comprehensive term referring to a wireless communications module that communicates with a base station in a wireless communications system, and should be interpreted as including not only a terminal in WCDMA, LTE, NR, HSPA, IMT-2020 (5G or New Radio), and the like, but also all of a mobile station (MS), a user terminal (UT), a subscriber station (SS), a wireless device, and the like, used in GSM. In addition, the terminal may refer to a user mobile device, such as a smartphone, depending on the type of use or may refer to a vehicle or a device including a wireless communications module in the vehicle in the vehicle-to-everything (V2X) communications system. Furthermore, in the machine type communications (MTC) system, the terminal may refer to an MTC terminal, a machine-to-machine (M2M) terminal, an ultra-reliability and low latency communications (URLLC) terminal, or the like, provided with a communications module able to perform machine type communications.

The term "base station" or "cell" used herein refers to an end in a network, communicating with the terminal, and comprehensively indicates a variety of coverage areas, such as a node-B, an evolved node-B (eNB), a gNodeB (gNB), a low power node (LPN), a sector, a site, an antenna having a variety of shapes, a base transceiver system (BTS), an access point, a point (e.g. a communication point, a reception point, or a transmission/reception point), a relay node, a megacell, a macrocell, a microcell, a picocell, a femtocell, a remote radio head (RRH), a radio unit (RU), and a small cell. In addition, the cell may be understood as including a bandwidth part (BWP) in a frequency domain. For example, a serving cell may refer to an activation BWP of the terminal.

Since at least one of the variety of cells as stated above is controlled by a dedicated base station, the base station may be interpreted in two senses. Each of the base stations 1) may be an apparatus itself providing a megacell, a macrocell, a microcell, a picocell, a femtocell, or a small cell in relation to a wireless communication area, or 2) may indicate the wireless communication area itself. In 1), when apparatuses providing wireless areas are controlled by the same entity or apparatuses interact with one another to form a wireless area in a coordinated manner, all of such apparatuses may be referred to as base stations. The transmission/reception point, the transmission point, the reception point, and the like are examples of the base station, according to the configuration of the wireless area. In 2), the wireless area itself in which a signal is received or transmitted may be referred to as a base station, from the perspective of a user or an adjacent base station.

The term "cell" used herein may refer to a coverage of a signal transmitted from the transmission point or the transmission/reception point, a component carrier having the coverage of the signal transmitted from transmission point or the transmission/reception point, or the transmission point or the transmission/reception point.

Here, the term "uplink (UL)" refers to a data transmission/reception method by which data is transmitted from the terminal to the base station, whereas the term "downlink (DL)" refers to a data transmission/reception method by which data is transmitted from the base station to the terminal. The downlink may refer to communications or a communication path from a multiple transmission/reception point to the terminal, whereas the uplink may refer to communications or a communication path from the terminal to the multiple transmission/reception point. In the downlink, a transmitter may be a portion of the multiple transmission/reception point, whereas a receiver may be a portion of the terminal. In addition, in the uplink, the transmitter may be a portion of the terminal, whereas the receiver may be a portion of the multiple transmission/reception point.

The uplink and the downlink transmit and receive control information via a control channel, such as a physical downlink control channel (PDCCH) or a physical uplink control channel (PUCCH), and transmit and receive data by forming a data channel, such as a physical downlink shared channel (PDSCH) or a physical uplink shared channel (PUSCH). Hereinafter, transmitting or receiving a signal via a channel, such as the PUCCH, the PUSCH, the PDCCH, or the PDSCH, may also be described as "transmitting or receiving the PUCCH, the PUSCH, the PDCCH, or the PDSCH".

To clarify the description, the principle of the present disclosure will be described with respect to 3GPP LTE/LTE-A/NR (New RAT) communications system but the technical features of the present disclosure are not limited to the corresponding communications system.

In 3GPP, 5th generation (5G) communications technology for meeting requirements for next generation wireless access technology of the international telecommunication union radiocommunication sector (ITU-R) is developed. Specifically, in 3GPP, research on new NR communications technology separate from LTE advanced Pro (LTE-A Pro) and 4G telecommunications technology improved from LTE Advanced in accordance with the requirements of the ITU-R is developed. Both LTE-A Pro and NR refer to 5G communications technology. Hereinafter, 5G communications technology will be described with respect to NR, except that a particular communications technology is specified.

In NR, a variety of operation scenarios are defined by adding considerations regarding satellites, vehicles, new vertical services, and the like to in typical 4G LTE scenarios. In terms of services, NR supports an enhanced mobile broadband (eMBB) scenario; a massive machine communication (MMTC) scenario having high terminal density, deployed over a wide range, and requiring low data rates and asynchronous accesses; and an ultra-reliability and low latency communications (URLLC) scenario requiring high responsiveness and reliability and able to support high-speed mobility.

In order to meet the scenario described above, NR discloses a wireless communications system using technologies providing a new waveform and frame structure, providing a low latency, supporting ultrahigh frequency waves (mmWave), and providing forward compatibility. In particular, the NR system presents various technical changes in terms of flexibility in order to provide forward compatibility. Major technical features of NR will be described hereinafter with reference to the drawings.

<Principle of NR System>

FIG. 1 is a diagram schematically illustrating a structure of an NR wireless communications system to which embodiments of the present disclosure are applicable.

Referring to FIG. 1, the NR system is divided into a 5G core network (5GC) part and an NR-RAN part. The NG-RAN includes gNBs and ng-eNBs providing protocol ends of a user plane (SDAP/PDCP/RLC/MAC/PHY) and a control plane (or a radio resource control (RRC)) for user equipment UE (or terminal). The gNBs are connected to each other, or the gNBs and the ng-eNBs are connected to each other via an Xn interface. The gNBs and the ng-eNBs are connected to each other via an NG interface in the 5GC. The 5GC may include an access and mobility management function (AMF) managing a control plane, such as terminal access and mobility control, and a user plane function (UPF) managing a control function over user data. The NR system supports both a frequency range of 6 GHz or lower, i.e. frequency range 1 (FR1), and a frequency range of 6 GHz or higher, i.e. frequency range 2 (FR2).

The gNBs refer to base stations providing the NR user plane and control plane protocol ends to the terminal, whereas the ng-eNBs refer to base stations providing evolved UMTS (E-UTRA) user plane and control plane protocol ends to the terminal. The term "base station" used herein should be understood as comprehensively indicating the gNB and the ng-eNB, or may be used as separately indicating the gNB and the ng-eNB as required.

<NR Waveform, Numerology, and Frame Structure>

In NR, cyclic prefix orthogonal frequency-division multiplexing (CP-OFDM) waveforms using the cyclic prefix (CP) for downlink transmissions are used, and CP-OFDM or discrete Fourier transform spread (DFT-s)-OFDM is used for uplink transmissions. The OFDM technology has advantages in that the OFDM technology may be easily combined with a multiple-input multiple-output (MIMO) method, may have a high frequency efficiency, and may use a low-complexity receiver.

In addition, in NR, requirements for data rate, latency, coverage, and the like are different according to the above-described three scenarios. Thus, it is necessary to efficiently meet the requirements according to the scenarios through frequency ranges of the NR system. In this regard, a technology for efficiently multiplexing a plurality of different numerology-based radio resources has been proposed.

Specifically, NR transmission numerology is determined on the basis of subcarrier spacing and the cyclic prefix (CP), and μ values are exponential values of 2 on the basis of 15 kHz and are exponentially changed, as described in Table 1 below.

TABLE 1

| μ | Subcarrier Spacing | Cyclic Prefix | Supported for Data | Supported for Synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As described in Table 1 above, the numerology of NR may be divided into five types according to the subcarrier spacing. This differs from the feature of LTE, i.e. one of 4G communications technologies, in which the subcarrier spacing is fixed to 15 kHz. Specifically, in NR, the subcarrier spacings used for data transmissions are 15, 30, 60, and 120 kHz, and the subcarrier spacings used for synchronous signal transmissions are 15, 30, 12, and 240 kHz. In addition, an extended CP is only applied to 60 kHz subcarrier spacing. On the other hand, the frame structure in NR is defined as a frame having a length of 10 ms comprised of 10 subframes having the same lengths of 10 ms. A single frame may be divided into 5 ms half frames, each of which includes five subframes. In the case of 15 kHz subcarrier spacing, a single subframe comprises a single slot, and each slot comprises fourteen OFDM symbols.

Figure 2:
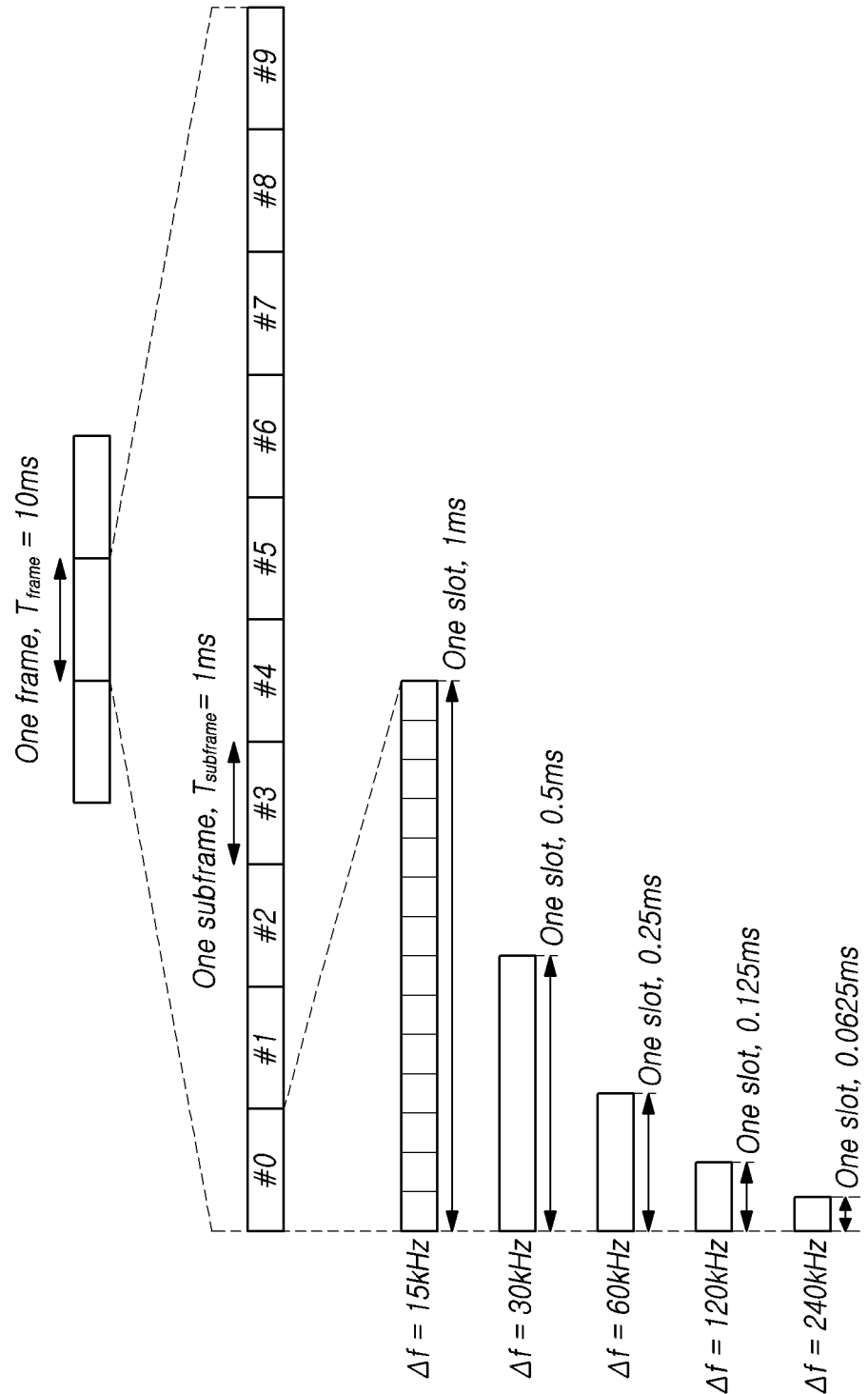
FIG. 2 is a diagram illustrating the frame structure in the NR wireless communications system to which embodiments are applicable.

FIG. 2 is a diagram illustrating the frame structure in the NR system to which embodiments of the present disclosure are applicable.

Referring to FIG. 2, the slot is constantly comprised of 14 OFDM symbols in the case of a normal CP, but the length of the slot in the time domain may vary depending on the subcarrier spacing. For example, when the numerology has the 15 kHz subcarrier spacing, the length of the slot is 1 ms, identical to that of the subframe. Differently thereto, when the numerology has the 30 kHz subcarrier spacing, the slot may be comprised of 14 OFDM symbols and have 0.5 ms length, such that two slots may be included in a single subframe. That is, each of the subframe and the frame is defined having a fixed time length, and the slot may be defined by the number of symbols, such that the time length may vary depending on the subcarrier spacing.

In addition, in NR, the slot is defined as a basic unit of the scheduling, and a mini-slot (or a sub-slot or a non-slot based schedule) is introduced in order to reduce a transmission delay in a wireless section. When a wide subcarrier spacing is used, the transmission delay in the wireless section may be reduced, since the length of a single slot is shortened in inverse proportion thereto. The mini-slot (or sub-slot) is devised to efficiently support URLLC scenarios and scheduling on the basis of 2, 4, or 7 symbols may be possible.

In addition, unlike LTE, NR defines uplink and downlink resource allocations as symbol levels in a single slot. In order to reduce hybrid automatic repeat request (HARQ) latency, a slot structure able to directly transmit at least one of an HARQ acknowledgement (HARQACK) or an HARQ negative acknowledgement (HARQNACK) in a transmission slot is defined. In the description, this slot structure will be referred to as a self-contained structure.

NR is designed to support a total of 256 slot formats, of which 62 slot formats are used in 3GPP Rel-15. In addition, various slot combinations support a common frame structure including an FDD, or a TDD frame. For example, NR supports a slot structure in which all symbols of the slot are configured as downlinks, a slot structure in which all symbols of the slot are configured as uplinks, and a slot structure in which downlink symbols and uplink symbols are combined. In addition, NR supports a form of scheduling in which data transmission is distributed in one or more slots. Accordingly, the base station may inform the terminal of whether a corresponding slot is a downlink slot, an uplink slot, or a flexible slot, using a slot format indicator (SFI). The base station may indicate a slot format by indicating an index of a table, configured by terminal-specific (UE-specific) RRC signaling, using the SFI, dynamically using downlink control information (DCI), or statically or quasi-statically through the RRC.

<NR Physical Resource>

Regarding the physical resources in NR, antenna ports, resource grids, resource elements (RE), resource blocks, bandwidth parts (BWPs), and the like are considered.

The term "antenna port" is defined such that a channel carrying a symbol on an antenna port may be inferred from a channel carrying another symbol on the same antenna port. When the large-scale property of a channel carrying the symbol on one antenna port is inferable from a channel carrying a symbol on another antenna port, the two antenna ports may be in a quasi co-located or quasi co-location (QC/QCL) relationship. Here, the large-scale property includes at least one of a delay spread, a Doppler spread, a frequency shift, average received power, and received timing.

Figure 3:
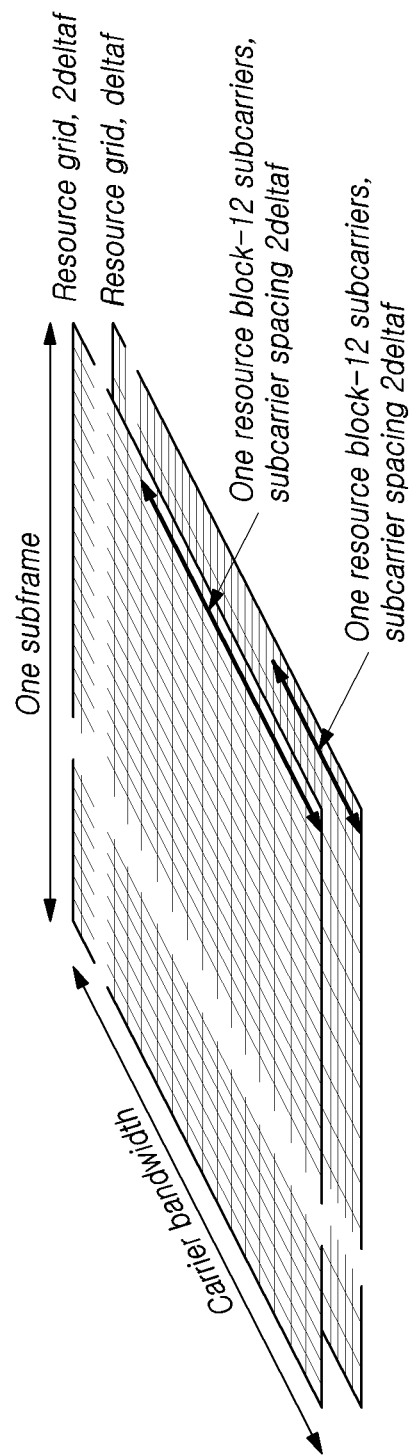
FIG. 3 is a diagram illustrating a resource grid supported by wireless access technology to which embodiments are applicable.

FIG. 3 is a diagram illustrating a resource grid supported by wireless access technology to which embodiments of the present disclosure are applicable.

Referring to FIG. 3, since NR supports a plurality of numerologies in the same carrier, the resource grid maybe present according to each numerology. In addition, the resource grid may be configured depending on the antenna port, the subcarrier spacing, and the transmission direction.

A resource block is comprised of 12 subcarriers and is only defined in a frequency domain. In addition, a resource element is comprised of one OFDM symbol and one subcarrier. Therefore, as shown in FIG. 3, the size of one resource block may vary depending on the subcarrier spacing. In addition, NR defines "point A" serving as a common reference point for a resource block grid, a common resource block, and a virtual resource block.

Figure 4:
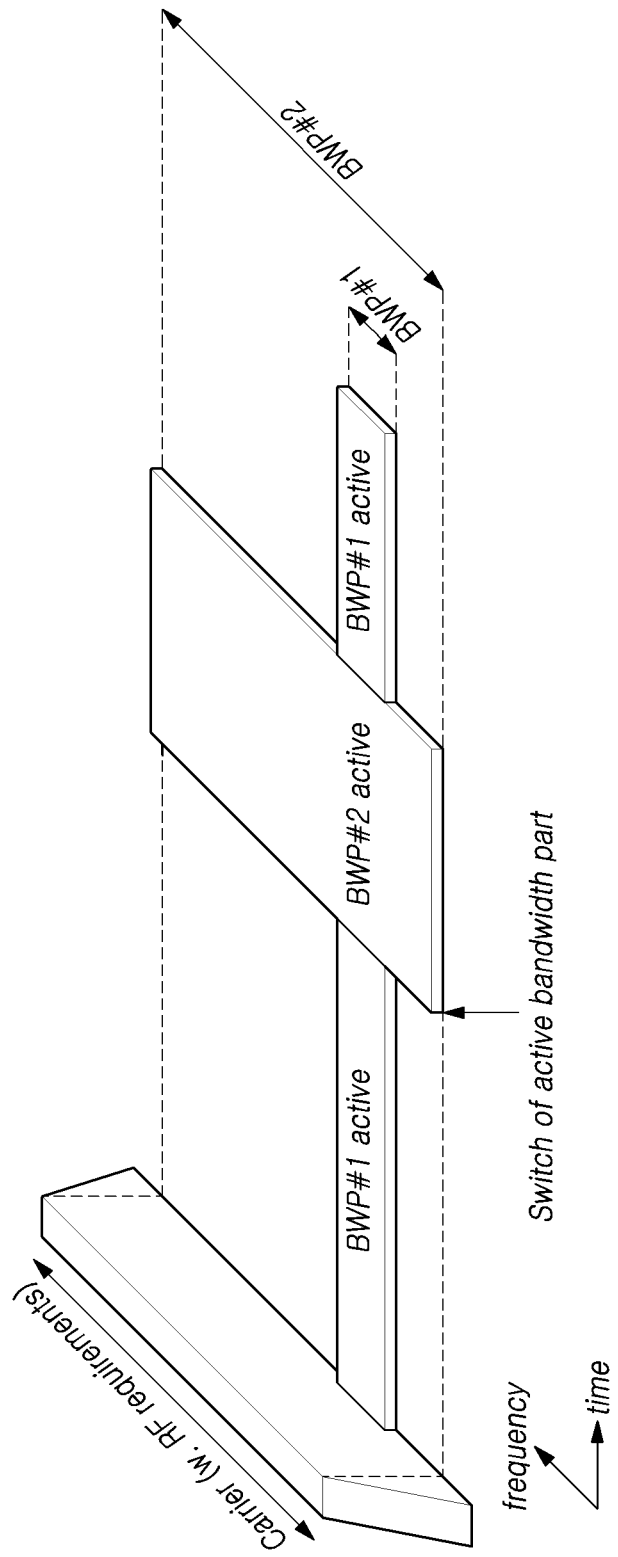
FIG. 4 is a diagram illustrating a bandwidth part supported by wireless access technology to which embodiments are applicable.

FIG. 4 is a diagram illustrating a BWP supported by wireless access technology to which embodiments of the present disclosure are applicable.

In the NR, the maximum carrier bandwidth is configured to be in the range from 50 MHz to 400 MHz depending on the subcarrier spacing, unlike in the LTE with the carrier bandwidth thereof being fixed to 20 MHz. Thus, it is not assumed that all terminals use all of these carrier bandwidths. Accordingly, as illustrated in FIG. 4, in NR, a bandwidth part (BWP) may be designated within a carrier bandwidth so as to be used by the terminal. In addition, the BWP may be associated with one numerology, be comprised of a contiguous subset of the common resource blocks, and be dynamically activated over time. The terminal is provided with up to four BWPs in each of an uplink and a downlink, and transmits and receives data using an activated BWP at a given time.

In the case of a paired spectrum, the uplink and downlink BWPs are configured independently. In the case of an unpaired spectrum, the uplink BWP and the downlink BWP are configured in pairs such that the center frequency may be shared therebetween in order to prevent unnecessary frequency re-tuning between downlink and uplink operations.

<Initial Access of NR>

In NR, the terminal performs cell search and random access procedures to access a base station and performs communications with the base station.

The cell search procedure is a procedure of synchronizing the terminal with the cell of a corresponding base station using asynchronization signal block (SSB) transmitted from the base station, acquiring a physical layer cell identifier (ID), and acquiring system information.

Figure 5:
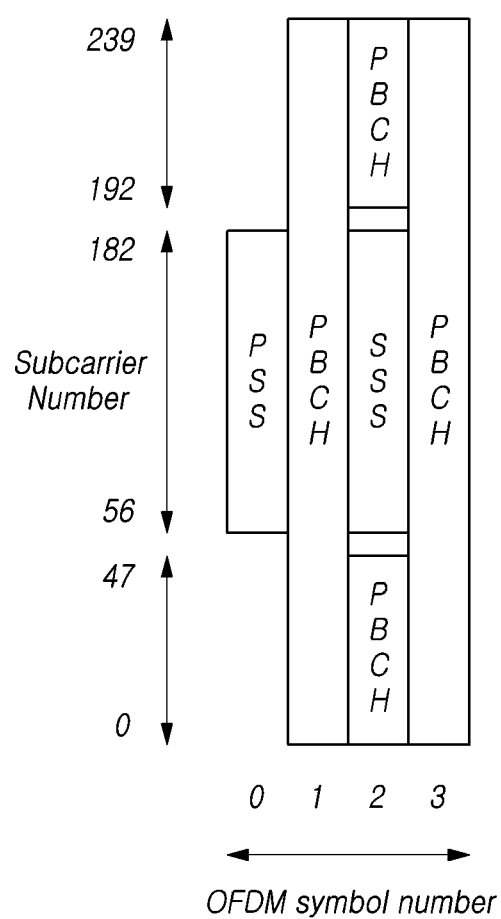
FIG. 5 is a diagram illustrating an example synchronization signal block in wireless access technology to which embodiments are applicable.

FIG. 5 is a diagram illustrating an example synchronization signal block in wireless access technology to which embodiments of the present disclosure are applicable.

Referring to FIG. 5, an SSB includes a primary synchronization signal (PSS) and a secondary synchronization signal (SSS), each of which occupies one symbol and 127 subcarriers, and a physical broadcast channel (PBCH) covering three OFDM symbols and 240 subcarriers.

The terminal receives the SSB by monitoring the SSB in time and frequency domains.

The SSB may be transmitted up to 64 times for 5 ms. A plurality of SSBs are transmitted on different transmission beams within a period of 5 ms, and the terminal performs detection on the assumption that an SSB is transmitted at every 20 ms period, on the basis of a specific beam used for transmission. The number of beams that may be used for the SSB transmission within the 5 ms period may increase with increases in the frequency range. For example, up to four SSB beams may be transmitted in a frequency range of 3 GHz or lower. SSB may be transmitted using up to eight beams in a frequency range of 3 to 6 GHz and up to 64 different beams in a frequency range of 6 GHz or higher.

Two SSBs are included in one slot, and the start symbol and the number of repetitions in the slot are determined depending on the subcarrier spacing as will be described below.

In addition, unlike an SS of related-art LTE, the SSB is not transmitted at the center frequency of a carrier bandwidth. That is, the SSB may be transmitted on a frequency that is not the center frequency of a system range, and a plurality of SSBs maybe transmitted in a frequency domain when a wideband operation is supported. Thus, the terminal monitors the SSBs using a synchronization raster that is a candidate frequency position for the monitoring of the SSBs. A carrier raster and the synchronous raster, which are center frequency position information of a channel for initial access, are newly defined in NR. The synchronous raster is configured to have a wider frequency interval than the carrier raster, and thus, may support the terminal for rapid SSB search.

The terminal may acquire a master information block (MIB) through the PBCH of the SSB. The MIB includes minimum information by which the terminal receives remaining minimum system information (RMSI) broadcast by the network. In addition, the PBCH may include information regarding the position of a first demodulation reference signal (DM-RS) symbol in the time domain, information (e.g. system information block 1 (SIB1) numerology information, information regarding an SIB1 control resource set (SIB1 CORESET), search space information, or PDCCH related parameter information) by which the terminal monitors SIB1, information regarding an offset between a common resource block and an SSB (where the absolute position of the SSB in the carrier is transmitted via SIB1), and the like. Here, the SIB1 numerology information is equally applied to some messages used in a random access procedure for accessing a base station after the terminal has completed the cell search procedure. For example, the SIB1 numerology information may be applied to at least one of messages 1 to 4 for the random access procedure.

The above-described RMSI may refer to system information block 1 (SIB1), which is periodically broadcast (e.g. at 160 ms) in the cell. SIB1 includes information necessary for the terminal to perform an initial random access procedure and is periodically transmitted through the PDSCH. In order for the terminal to receive SIB1, the terminal is required to receive numerology information, which is used for SIB1 transmission, and control resource set (CORESET) information, which is used for SIB1 scheduling, through the PBCH. The terminal checks scheduling information regarding SIB1 using a system information radio network temporary identifier (SI-RNTI) in the CORESET, and acquires SIB1 on the PDSCH according to the scheduling information. The remaining SIBs other than SIB1 may be periodically transmitted or may be transmitted at the request of the terminal.

Figure 6:
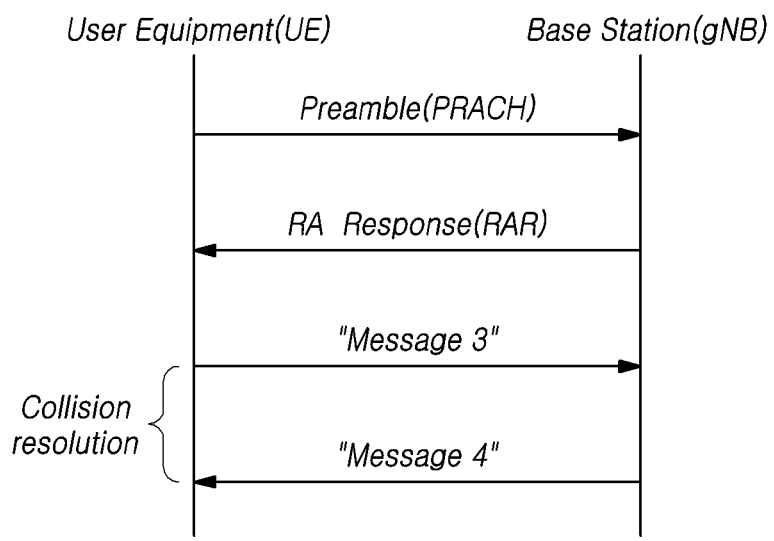
FIG. 6 is a diagram illustrating a random access procedure in wireless access technology to which embodiments are applicable.

FIG. 6 is a diagram illustrating a random access procedure in wireless access technology to which embodiments of the present disclosure are applicable.

Referring to FIG. 6, when cell search is completed, the terminal transmits a random access preamble, in use for random access, to the base station. The random access preamble is transmitted through a physical random access channel (PRACH). Specifically, the random access preamble is transmitted to the base station through the PRACH comprised of consecutive radio resources in a predetermined slot periodically repeated. In general, a contention-based random access procedure is performed when terminal initially accesses a cell, whereas a non-contention based random access procedure is performed when random access is performed for beam failure recovery (BFR).

The terminal receives a random access response to the transmitted random access preamble. The random access response may include a random access preamble identifier (ID), an uplink (UL) radio resource grant, a temporary cell radio network temporary ID (temporary C-RNTI), and a time alignment command (TAC). Since one random access response may include random access response information regarding one or more sets of terminal, the random access preamble ID may be included to order to indicate to which terminal the included UL grant, the temporary C-RNTI, and the TAC are valid. The random access preamble ID may be an ID of the random access preamble that the base station has received. The TAC may be included as information by which the terminal adjusts uplink synchronization. The random access response may be indicated by a random access ID on the PDCCH, i.e., a random access-radio network temporary ID (RA-RNTI).

When the valid random access response is received, the terminal processes information included in the random access response and performs a scheduled transmission to the base station. For example, the terminal applies the TAC and stores the temporary C-RNTI. In addition, the terminal transmits data stored in a buffer or newly generated data to the base station, using the UL grant. In this case, information by which the terminal may be identified must be included.

Finally, the RA-RNTI receives a downlink message for contention resolution.

<NR Coreset>

In NR, a downlink control channel is transmitted on a control resource set (CORESET) having a length of 1 to 3 symbols. Up/down scheduling information, slot format index (SFI) information, transmit power control information, and the like are transmitted through the downlink control channel.

Thus, in NR, in order to secure the flexibility of the system, the CORESET is introduced. The control resource set (CORESET) refers to a time-frequency resource for a downlink control signal. The terminal may decode a control channel candidate using one or more search spaces in a CORESET time-frequency resource. Quasi colocation (QCL) assumption is established according to the CORESET. The QCL assumption is used in order to inform the characteristics of analogue beam directions in addition to characteristics assumed by related-art QCL, such as a delayed spread, a Doppler spread, a Doppler shift, or an average delay.

Figure 7:
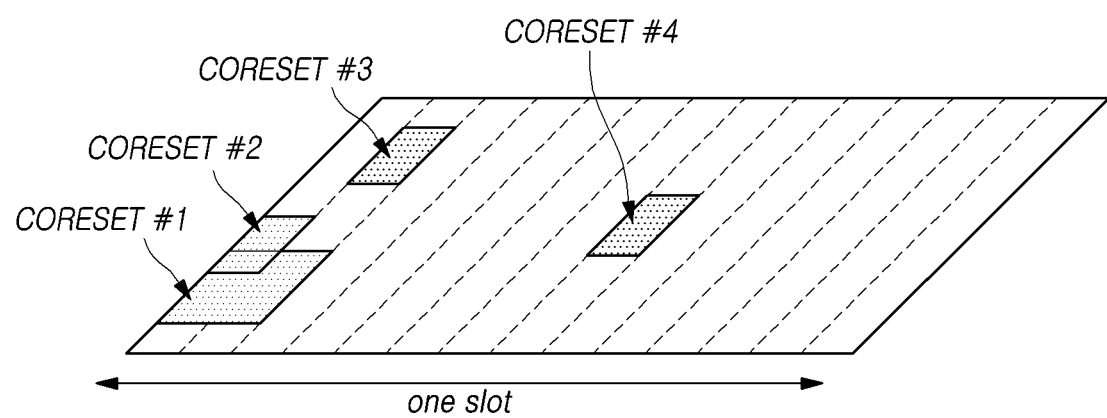
FIG. 7 is a diagram illustrating a CORESET to which embodiments are applicable.

FIG. 7 is a diagram illustrating a CORESET.

Referring to FIG. 7, the CORESET may have a variety of forms within a carrier bandwidth in a single slot. The CORESET may be comprised of up to three OFDM symbols in the time domain. In addition, the CORESET is defined as a multiple of six resource blocks up to the carrier bandwidth in the frequency domain.

The first CORESET is a portion of an initial BWP configuration, indicated through the MIB so as to be able to receive additional configuration information and system information from the network. After a connection to the base station is established, the terminal may receive and configure one or more pieces of CORESET information through RRC signaling.

Herein, terms, such as frequency, frame, subframe, resource, resource block, region, band, sub-band, control channel, data channel, synchronization signal, various reference signals, various signals, or various messages, related to new radio access technology (NR) may be interpreted as having a variety of meanings related to concepts used in the past or present or which will be used in the future.

<Sidelink>

In existing LTE systems, wireless channels and wireless protocols have been designed for direct (i.e. sidelink) communications between terminals in order to provide direct terminal-to-terminal communications and V2X (in particular, V2V) services.

Regarding the sidelink, synchronization signals, e.g. a sidelink primary synchronization signal (S-PSS) and a sideline secondary synchronization signal (S-SSS), for synchronization between a transmission port and a receiver port of the wireless sidelink and a physical sidelink broadcasting channel (PSBCH) for the transmission and reception of a related sidelink master information block (MIB) are defined. In addition, a physical sidelink discovery channel (PSDCH) for transmission and reception of discovery information, a physical sidelink control channel (PSCCH) for transmission and reception of sidelink control information (SCI), and a physical sidelink shared channel (PSSCH) for transmission and reception of sidelink data are designed.

In addition, technological developments, made for wireless resource allocation (or radio resource allocation) for the sidelink, have been divided into Mode 1, in which the base station allocates wireless resources and Mode 2, in which the terminal performs allocation by selecting a wireless resource pool. In addition, the LTE system requires additional technological evolution in order to meet V2X scenarios.

In this environment, the 3GPP has deduced27 service scenarios related to the recognition of a vehicle in the Rel-14 and determined major performance requirements according to road situations. In addition, in the Rel-15, six performance requirements are determined by deducing more advanced 25 service scenarios, such as platooning, advanced driving, and long-distance vehicle sensing.

In order to meet such performance requirements, technical development has been carried out to improve the performance of conventional sidelink technology developed on the basis of D2D communications to comply with the V2X requirements. In particular, for application to the cellular-V2X (C-V2X), a technology for improving a physical sidelink layer design to comply with a high-speed environment, a resource allocation technology, and a synchronization technology may be selected as major research technologies.

The sidelink to be described hereinafter may be construed as comprehensively including links used in D2D communications developed after 3GPP Rel-12, V2Xcommunications after the Rel-14, and the NR V2X after the Rel-15. In addition, respective terms related to channels, synchronization, resources, and the like will be described as being the same terms irrespective of the D2D communications requirements or the V2X Rel-14/15 requirements. However, for a better understanding, features of the sidelink meeting the V2X scenario requirements, different from the sidelink for D2D communications in the Rel-12/13, will mainly be described. Therefore, the terms related to the sidelink to be described hereinafter are merely intended to describe D2D communications, V2Xcommunications, and C-V2Xcommunications in a discriminative manner in order to compare differences thereof and assist in the understanding thereof, but are not applied to a specific scenario in a limitative manner.

<Resource Allocation>

Figure 8:
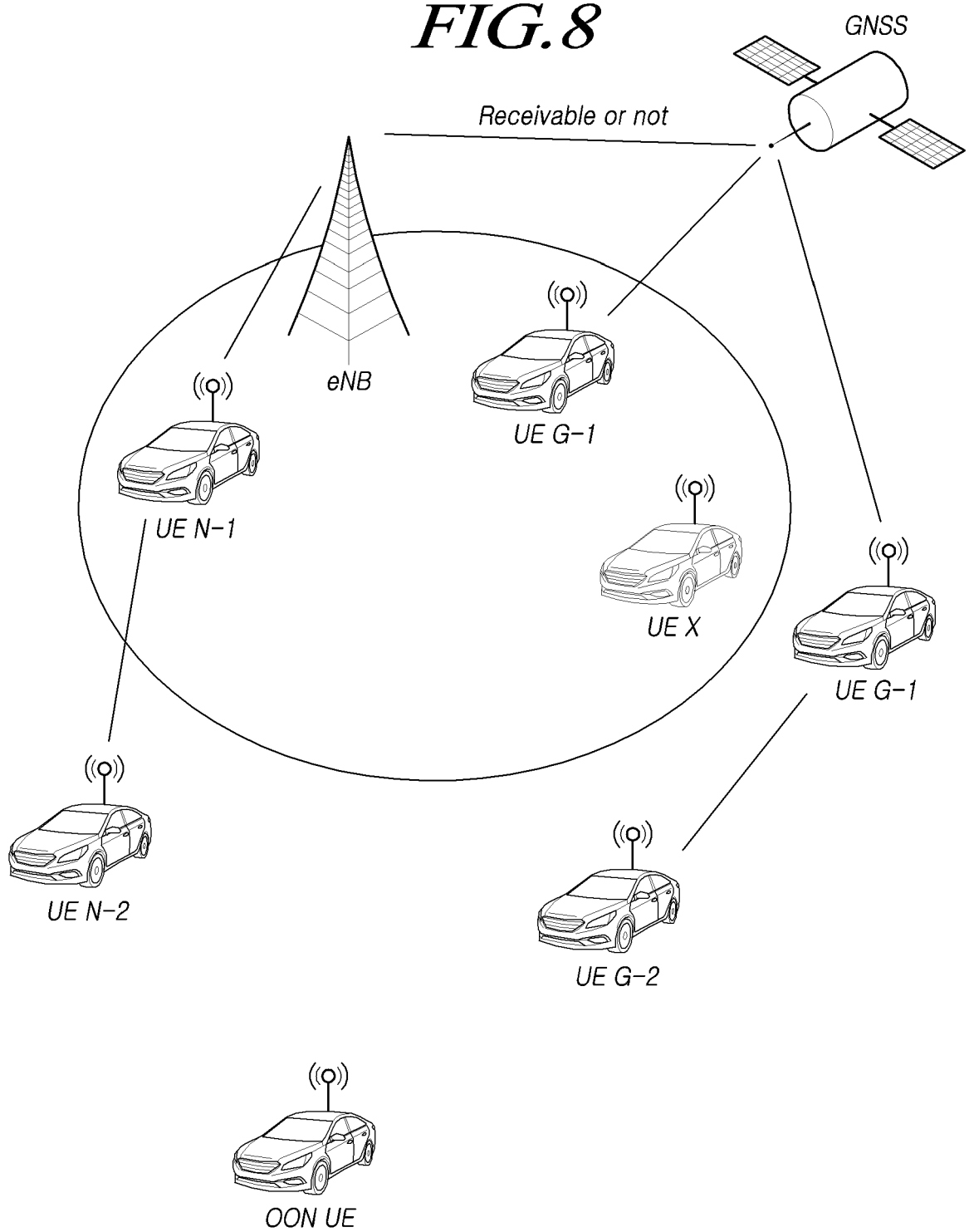
FIG. 8 is a diagram illustrating a variety of scenarios for V2X communications.

FIG. 8 is a diagram illustrating a variety of scenarios for V2Xcommunications.

Referring to FIG. 8, V2X terminals may be located inside or outside of the coverage of a base station eNB (or gNB or ng-eNB). (Although the V2X terminals are illustrated as being vehicles, the V2X terminals may be a variety of devices, such as a user terminal.) For example, communications may be performed between terminals (UE N-1, UE G-1, and UE X) inside the coverage of the base station (or base station coverage) or between a terminal (e.g. UE G-1) inside the base station coverage and a terminal (e.g. UE N-2) outside of the base station coverage. In addition, communications may be performed between terminals (e.g. UE G-1 and UE G-2) outside of the base station coverage.

In such a variety of scenarios, the allocation of wireless resources for communications is required so that the corresponding terminal performs sidelink communications. The allocation of wireless resources is generally divided into an allocation method handled by the base station and an allocation method selected by the terminal.

Specifically, the method in which the terminal allocates resources in the sidelink includes a method in which the base station intervenes in the selection and management of resources (Mode 1) and a method in which the terminal directly selects resources (Mode 2). In Mode 1, the base station performs scheduling of a transmitting terminal about a scheduling assignment (SA) pool resource domain and a DATA pool resource domain allocated thereto.

FIGS. 9*a* and 9*b* illustrate an example of terminals UE1 and UE1 performing sidelink communications and an example of a sidelink resource pool used by the terminals.

Referring to FIGS. 9*a* and 9*b*, a base station is illustrated as being an eNB, but may be a gNB or an ng-eNB. In addition, the terminals are illustrated as being cellular phones, but may be applied to a variety of devices, such as a vehicle or an infrastructure device.

In FIG. 9*a*, the transmitting terminal UE1 may select a resource unit corresponding to a predetermined resource from a resource pool indicating a set of resources and transmit a sidelink signal using the corresponding resource unit. The receiving terminal UE2 may have the resource pool, which the transmitting terminal UE1 may transmit, configured therein and detect the signal transmitted by the transmitting terminal.

Here, when the terminal UE1 is inside the base station coverage, the resource pool may be informed by the base station. When the terminal UE1 is outside of the base station coverage, the resource pool may be informed by another terminal or may be determined to be a predetermined resource. In general, the resource pool is comprised of a plurality of resource units, and each terminal may select one or more resource units and use the selected resource units when transmitting sidelink signals.

Referring to FIG. 9*b*, it may be appreciated that a total of NFXNT number of resource units are defined, with entire frequency resources being divided into NF number of frequency resource units, and time resources being divided into NT number of time resource units. Here, the corresponding resource pool may be regarded as being repeated in a period of an NT subframe. In particular, as illustrated in the figures, a single resource unit may repeatedly appear in a periodic manner.

In addition, the resource pools may be divided into a plurality of types. First, the resource pools may be divided according to contents of sidelink signals transmitted by respective resource pools. For example, the contents of the sidelink signals may be divided, and separate resource pools may be configured therefor, respectively. The contents of the sidelink signals may include scheduling assignment (SA), a sidelink data channel, and a discovery channel.

The SA may be a signal including information regarding the position of a source that the transmitting terminal uses for the transmission of a subsequent sidelink data channel, a modulation and coding scheme (MCS) or multiple-input multiple-output (MIMO) transmission method required for the modulation of other data channels, timing advance (TA), and the like. This signal may be multiplexed and transmitted together with sidelink data on the same resource unit. In this case, the SA resource pool may refer to a pool of resources via which the SA is multiplexed and transmitted together with sidelink data.

In addition, a frequency division multiplexing (FDM) method used in V2Xcommunications may reduce a delay time by which a data resource is applied after SA resource allocation. For example, a non-adjacent method by which control channel resources and data channel resources are divided on the time domain in a single subframe and an adjacent method by which control channel resources and data channel resources are continuously allocated in a single subframe are considered.

In addition, in a case in which the SA is multiplexed and transmitted together with the sidelink data on the same resource unit, only the sidelink data channel, from which SA information is excluded, may be transmitted in the resource pool for the sidelink data channel. In other words, resource elements that have been used to transmit the SA information on individual resource units in the SA resource pool may still be used in the sidelink data channel resource pool to transmit the sidelink data. The discovery channel may be a resource pool for a message with which the transmitting terminal transmits information, such as the ID thereof, thereby allowing an adjacent terminal to discover the transmitting terminal. Even in a case in which the contents of the sidelink signal are the same, different resource pools may be used according to transmission and reception properties of the sidelink signal.

For example, even the same sidelink data channels or the same discovery messages may be subdivided into different resource pools, according to how to determine a point in time at which the sidelink signal is transmitted (e.g. whether the sidelink signal is transmitted at a point in time at which a synchronization reference signal is received or at a point in time obtained by applying a predetermined TA to the point in time at which the synchronization reference signal is received), a resource allocation method (e.g. whether the base station designates transmission resources of individual signals to individual transmitting terminals or individual transmitting terminals directly select individual signal transmission resources within the pool), a signal format (e.g. the number of symbols that each sidelink signal occupies in a single subframe or the number of subframes used in the transmission of a single sidelink signal), the intensity of a signal from the base station, the intensity of transmission power of the sidelink terminal, and the like.

<Synchronization Signal>

As described above, it is highly possible that the sidelink communications terminal may be located outside of the base station coverage. Even in this case, communications using the sidelink must be performed. In this regard, it is important that the terminal located outside of the base station coverage obtains synchronization.

Hereinafter, a method of determining time and frequency synchronization in sidelink communications, in particular, vehicle-to-vehicle communications, communications between a vehicle and another terminal, and communications between a vehicle and an infranet work, will be described on the basis of the above description.

D2Dcommunications have used a sidelink synchronization signal (SLSS), i.e. a synchronization signal that a base station transmits for time synchronization between terminals. In the C-V2X, the global navigation satellite system (GNSS) may be additionally considered in order to improve synchronization performance. However, priority may be imparted to synchronization establishment, or the base station may indicate information regarding priority. For example, when the terminal determines the transmission synchronization thereof, the terminal has highest priority in selecting a synchronization signal that the base station directly transmits. When the terminal is located outside of the base station coverage, the terminal has priority in synchronization with the SLSS that a terminal inside the base station coverage.

In addition, a wireless terminal disposed in a vehicle or a terminal mounted on a vehicle has a less problem related to the consumption of the battery. In addition, since satellite signals, e.g. signals of the global positioning system (GPS), may be used for navigation, the satellite signals may be used for time or frequency synchronization between terminals. Here, the satellite signals may be signals of a global navigation satellite system (GNSS), such as GLONAS, GALILEO, or BEIDOU, in addition to the GPS.

In addition, the sidelink synchronization signals may include a sidelink primary synchronization signal (S-PSS) and a sideline secondary synchronization signal (S-SSS). The S-PSS may be a Zadoff-chu sequence having a predetermined length, a structure similar to, modified from, or obtained by repeating the PSS, or the like. In addition, unlike a DL PSS, a different Zadoff-chu root index (e.g. 26 or 37) may be used. The S-SSS may be an M-sequence, a structure similar to, modified from, or obtained by repeating the SSS, or the like. If the terminals obtain synchronization with the base station, an SRN is the base station, and a sidelink synchronization signal (S-SS) is a PSS/SSS.

Unlike the DL PSS/SSS, the S-PSS/S-SSS is compliant with a UL subcarrier mapping method. A physical sidelink broadcast channel (PSBCH) may be a channel through which system information, i.e. basic information that is the first thing which the terminal must be informed of, is transmitted before the transmission or reception of the sidelink signal. (Examples of the system information may include information regarding the S-SS, information regarding a duplex mode (DM), information regarding a TDD UL/DL configuration, information regarding the resource pool, types of applications related to the S-SS, subframe offset information, and broadcast information.) The PSBCH may be transmitted on a subframe the same as or subsequent to that of the S-SS. A demodulation reference signal (DMRS) may be mused for the demodulation of the PSBCH. The S-SS and the PSBCH may be described as being a sidelink synchronization signal block (S-SSB).

The SRN may be a node through which the S-SS and the PSBCH are transmitted. The S-SS may have a predetermined sequence type, while the PSBCH may be a sequence indicating predetermined information or a code word obtained after predetermined channel coding. Here, the SRN may be the base station or a predetermined sidelink terminal. In the case of a partial network coverage or out-of-network coverage, a terminal may be the SRN.

In addition, the S-SS may be relayed for sidelink communications with an out-of-coverage terminal as required or may be relayed by multi-hop relay. In the following description, relaying the synchronization signal refers to not only directly relaying the synchronization signal of the base station but also transmitting a sidelink synchronization signal having a separate format at a point in time at which the synchronization signal is received. Since the sidelink synchronization signal is relayed in this manner, a terminal inside the coverage and a terminal outside of the coverage may directly communicate with each other.

<NR Sidelink>

As described above, there is a demand for V2X technology based on NR in order to meet complicated requirements such as autonomous driving, unlike the V2X based on the LTE system.

In the NR V2X, the frame structure of NR, a numerology, a channel transmission and reception procedure, and the like are applied so that more flexible V2X services may be provided in a more variety of environments. In this regard, the development of a technology for sharing resources between the base station and the terminal, a sidelink carrier aggregation (CA) technology, a partial sensing technology for a pedestrian terminal, sTTI, and the like is required.

The NR V2X is designed to support not only broadcast used in the LTE V2X, but also unicast and group-cast. In this case, target group IDs are used for the group-cast and the unicast, but whether or not to use a source ID will be discussed later.

In addition, since the HARQ is supported for quality of service (QoS), the control information further includes an HARQ process ID. In the LTE HARQ, the PUCCH for the HARQ is transmitted after four subframes after downlink transmission. In contrast, in the NR HARQ, feedback timing, e.g. PUCCH resources and feedback timing, may be indicated using a PUCCH resource indicator or an HARQ feedback timing indicator regarding the PDSCH in DCI format 1_0 or 1_1.

Figure 10:
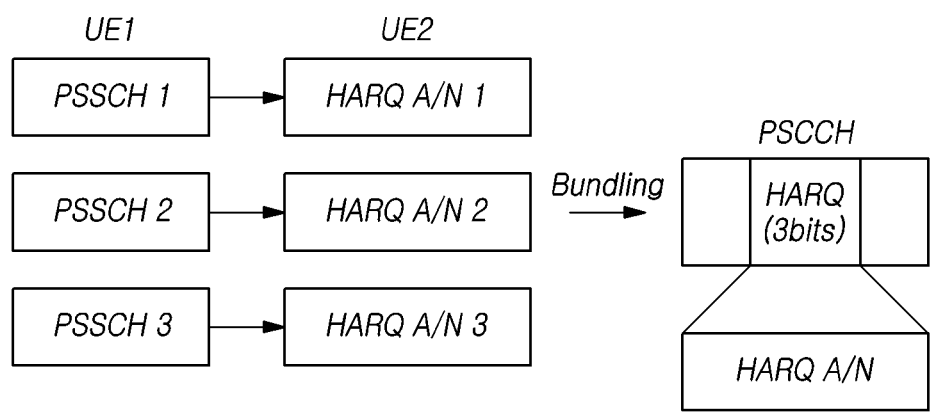
FIG. 10 is a diagram illustrating a method of bundling and transmitting HARQ feedback information in a sidelink.

FIG. 10 is a diagram illustrating a method of bundling and transmitting HARQ feedback information in a sidelink.

Referring to FIG. 10, in the LTE V2X, separate HARQ ACK/NACK information is not transmitted in order to reduce system overhead. In addition, according to selection, the transmitting terminal may retransmit data one time for data transmission reliability. However, the NR V2X may transmit the HARQ ACK/NACK information in terms of data transmission reliability. In this case, the corresponding information may be bundled and transmitted in order to reduce overhead.

That is, when the transmitting terminal UE1 transmits three sets of data to the receiving terminal UE2 and the receiving terminal responsively generates HARQ ACK/NACK information, the HARQ ACK/NACK information may be bundled and transmitted through the PSCCH. Although the HARA ACK/NACK is illustrated as being transmitted through the PSCCH in FIG. 10, the HARA ACK/NACK may be transmitted through a separate channel or a different channel. The bundled HARQ information may be configured to be 3 or less bits.

In addition, in FR1 for a frequency domain of 3 GHz or lower, 15 kHz, 30 kHz, 60 kHz, and 120 kHz are determined to be discussed as a candidate group for subscriber spacing (SCS). In addition, in FR2 for a frequency domain higher than 3 GHz, 30 kHz, 60 kHz, 120 kHz, and 240 kHz are determined to be discussed as a candidate group for the SCS. In the NR V2X, mini-slots (e.g. symbols 2, 4, and 7) smaller than 14 symbols may be supported as a minimum scheduling unit.

As an RS candidate group, DM-RS, PT-RS, CSI-RS, SRS, and AGC training signals will be discussed.

Sidelink UL SPS

In general, UL transmissions using SPS may cause a slight delay when there is a significant gap between the generation of user data and a configured SPS resource. Thus, when the SPS is used in a traffic, such as a sidelink communication traffic, sensitive to a delay, an SPS scheduling interval must be small enough to be able to support delay requirements.

However, since the terminal UE may not be able to sufficiently use the configured SPS resource, a smaller SPS scheduling interval may lead to greater overhead. Thus, the gap between the generation of user data and the configured SPS resource must be insignificant, and the SPS scheduling interval must be appropriate to meet delay requirements. At present, there is no mechanism supporting this function.

Figure 11:
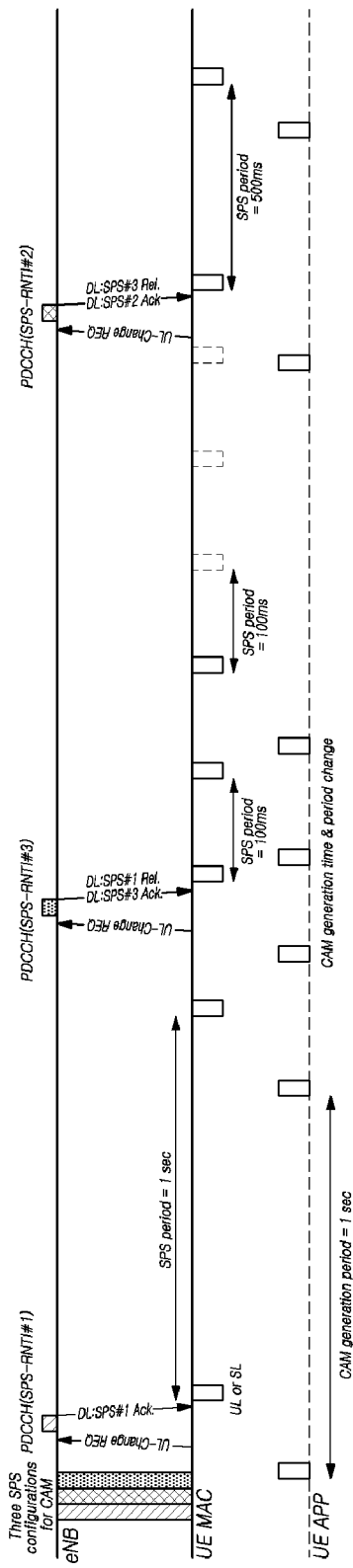
FIG. 11 illustrates a method of performing at least one of activation (request), reactivation (re-request), and release or change of an SPS triggered by the terminal (UE)

Accordingly, FIG. 11 illustrates a method of performing at least one of activation (request), reactivation (re-request), and release or change of an SPS triggered by the terminal UE.

A terminal UE may receive an SPS configuration for at least one predetermined logic channel. The terminal UE may receive the SPS configuration for the predetermined logic channel via system information, an RRC connection configuration message, an RRC connection reconfiguration message, or an RRC connection release message.

When data for at least one predetermined logic channel is usable, the terminal may transmit an SPS activation request to an eNB and perform UL transmission using the configured SPS resource in response to an SPS activation command received from the eNB. The terminal UE may transmit the SPS activation request to the eNB through a physical uplink control channel (PUCCH), a MAC control element (CE), or an RRC message. That is, the terminal may transmit the SPS activation request to the eNB using a control resource used when requesting SPS activation. The control resource may be a PUCCH resource, a random access resource, or a new UL control channel resource. In addition, the terminal UE may transmit the SPS activation request to the eNB, for example, during RRC connection establishment or establishment, during handover, after handover, or at RRC_CONNECTED.

In the presence of UL data to be transmitted, the terminal UE actively requests the SPS activation from the eNB. Thus, the gap between the generation of the UL data and the configured SPS resource may be reduced.

Referring to FIG. 11, the terminal receives SPS configuration information including three SPS configurations from the eNB. In the presence of UL data to be transmitted from a higher layer, the terminal transmits an SPS request message to the eNB through, for example, the MAC CE. The eNB sends an acknowledgement (ACK) message regarding one of the three SPS configurations. The terminal UE transmits UL data based on a predetermined resource, e.g. in a period of 1 sec, according to the corresponding SPS configuration.

In addition, in the presence of UL data to be transmitted from the higher layer at a predetermined point in time, the terminal UE retransmits the SPS request message to the eNB, for example, through the MAC CE. The eNB sends an acknowledgement message regarding another one of the three SPS configurations. The terminal UE transmits UL data through a predetermined resource, e.g. in a period of 100 sec, according to the corresponding SPS configuration.

In addition, S-SS id_net is a set of S-SS IDs selected from among physical layer SLSS IDs {0, 1, . . . , and 335}, used by terminals that have selected the synchronization signal of the base station as a synchronization reference. S-SS id_net may be {0, 1, . . . , and 167}. In addition, S-SS id_oon is a set of S-SS IDs that terminals outside of the base station coverage use when directly transmitting a synchronization signal. S-SS id_oon may be {168, 169, . . . , and 335}.

As described above, resource allocation, time synchronization setting, reference signal transmission, and the like are performed independently or in concert with the base station in terminal-to-terminal sidelink communication, unlike in related-art signal transmission and reception between a base station and a terminal.

In particular, in the case of next-generation wireless access technology (including terms, such as NR and 5G), a plurality of protocols between the base station and the terminal are added or modified. Accordingly, in NR technology-based sidelink communications, a variety of protocols are required to be newly developed, unlike related-art LTE-based V2X communication protocols.

The present disclosure is intended to propose operations, such as a synchronization signal receiving operation, resource allocation, and PSCCH, PSSCH, and DMRS configuration, in sidelink communications performed between a transmitting terminal and a receiving terminal. Although embodiments will be described hereinafter with respect to sidelink communications, the embodiments may be equally applied to C-V2X communications and D2D communications, as described above.

In NR, in response to changes in the subcarrier spacing (SCS) in an OFDM system, changes in the frame structure of a sidelink to be used when transmitting and receiving information in sidelink communications are also required.

In a CP-OFDM waveform and a DFT-s-OFDM waveform, the sidelink signal in embodiments may use the CP-OFDM waveform. In addition, the sidelink may use SCS as follows. For example, in frequency range (FR) 1 using a frequency range of 6 GHz or lower, SCSs of 15 kHz, 30 kHz, and 60 kHz are used. Here, the sidelink may be configured to mainly use the 60 kHz spacing exhibiting best performance. In FR 2 using a frequency range of 6 GHz or higher, 60 kHz and 120 kHz are used, and 60 kHz may mainly be used.

In addition, the sidelink uses a cyclic prefix (CP) in order to prevent demodulation that would otherwise occur during transmission and reception procedures in wireless communications. The length of the CP may be set to be the same as the length of the normal CP of an NR Uu interface. An extended CP may be used as required.

In this situation, the synchronization signal, resource allocation, and each sidelink channel structure of the sidelink need to be configured in consideration of efficiency.

Hereinafter, first, the configuration of a demodulation reference signal (DMRS) included in the PSSCH will be described.

Figure 12:
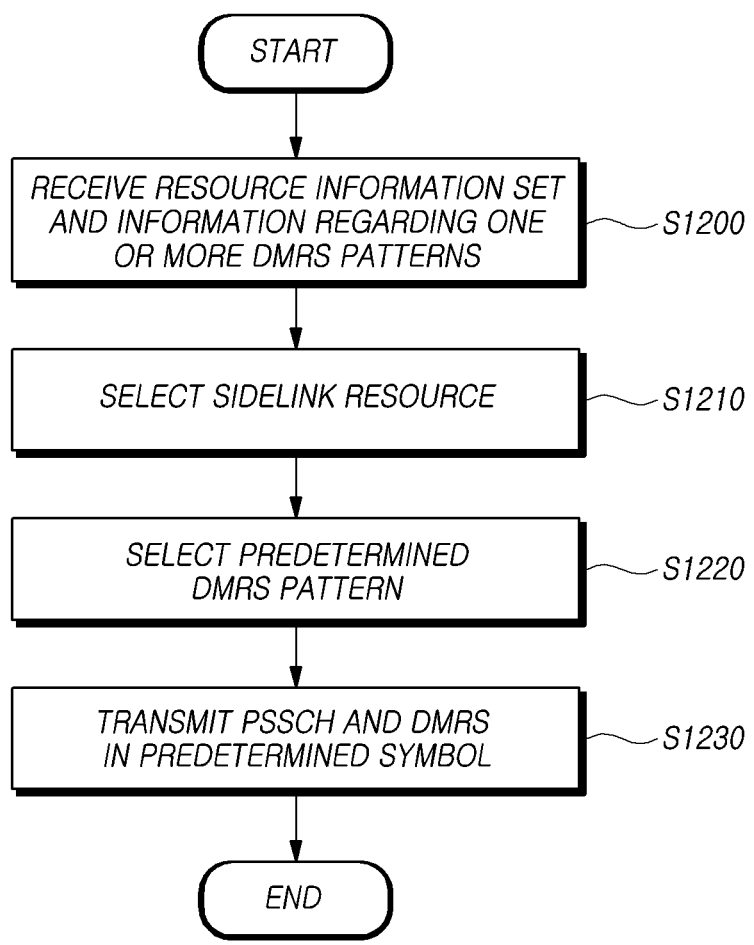
FIG. 12 is a diagram illustrating operations of a transmitting terminal according to an embodiment.

FIG. 12 is a diagram illustrating operations of a transmitting terminal according to an embodiment.

Referring to FIG. 12, the transmitting terminal may perform an operation of receiving information regarding one or more DMRS patterns and a resource information set including information regarding one or more sidelink resources in S1200.

In the case of sidelink communication, two types of resource allocation modes may be configured. For example, in Mode 1, the transmitting terminal requests sidelink wireless resource allocation from the base station and performs sidelink communication using a sidelink wireless resource allocated by the base station. In Mode 2, the base station allocates a resource information set, i.e. information regarding one or more sidelink wireless resources, to the sidelink terminal in advance, and the terminal performs sidelink communication by selecting a sidelink wireless resource from the allocated resource information set. Although the operations will be described as being set to Mode 2 in FIG. 12, the present disclosure is not limited thereto.

The resource information set and the information regarding one or more DMRS patterns may be received by higher layer signaling. For example, the transmitting terminal or a receiving terminal located inside the coverage of the base station receives the resource information set including one or more sidelink resources, to be used in sidelink communication, by RRC signaling. In addition, at least one of the transmitting terminal and the receiving terminal may receive the information regarding one or more DMRS patterns for sidelink communication from the base station. The transmitting terminal and the receiving terminal may respectively configure the resource information set and DMRS pattern information therein by receiving the same information.

In addition, the information regarding one or more DMRS patterns may be mapped according to the resource information set or the sidelink resources. For example, when a first resource information set including one or more pieces of resource information and a second resource information set including one or more pieces of resource information are indicated by the base station, information regarding a single first DMRS pattern for the first resource information set and information regarding a single second DMRS pattern for the second resource information set may be indicated by being mapped to the resource information set. Alternatively, the DMRS pattern information may be indicated by being mapped according to respective sidelink resources included in a single resource information set. Alternatively, the DMRS pattern information may be indicated by being mapped according to two or more sidelink resource sub-sets included in a single resource information set. Alternatively, the DMRS pattern information may be indicated by being mapped to respective groups obtained by grouping two or more resource information sets. In addition, the sidelink resources and the DMRS patterns may be indicated by being mapped in a variety of forms.

The transmitting terminal configures the received resource information sets and the received DMRS patterns therein.

In S1210, the transmitting terminal may perform an operation of selecting a single sidelink resource, via which sidelink communication is performed, on the basis of the resource information set.

When sidelink communication is triggered, the transmitting terminal selects a predetermined sidelink resource from the configured resource information set. A method by which the terminal selects the predetermined sidelink resource from the configured resource information set for sidelink communication may be performed according to a variety of standards. For example, the transmitting terminal may select the predetermined sidelink resource according to priorities allocated to a plurality of sidelink resources. Alternatively, the terminal may detect whether or not each of the plurality of sidelink resources is used and select a sidelink resource having a detection result value equal to or smaller than a reference value. That is, the transmitting terminal may select a sidelink resource to use by detecting sidelink resources, each of which is not used or is used less.

In S1220, the transmitting terminal may perform an operation of selecting a predetermined DMRS pattern from the information regarding one or more DMRS patterns on the basis of the selected sidelink resource.

For example, when a single sidelink resource is selected, the transmitting terminal may select a DMRS pattern configured by being mapped to the selected sidelink resource. Alternatively, the transmitting terminal may select the DMRS pattern on the basis of property information of the selected sidelink resource.

For example, the selected predetermined DMRS pattern may be determined on the basis of information regarding consecutive symbols of a sidelink resource selected for transmission of a physical sidelink shared channel (PSSCH), information regarding the number of symbols to which a physical sidelink control channel (PSCCH) is allocated, and information regarding the number of symbols of a DMRS included in the PSSCH. Specifically, when a PSSCH sidelink resource, via which sidelink data is to be transmitted, is selected, information regarding consecutive symbols of the corresponding PSSCH sidelink resource, the number of symbols of the PSCCH allocated in a slot in which the PSSCH is transmitted, and the number of DMRS symbols may be determined. In this case, the position of a symbol, through which the DMRS is to be transmitted, may be determined according to combinations of respective situations, on the basis of previously-configured information in the form of a table. This will be described in more detail hereinafter with reference to the accompanying drawings.

For example, the information regarding the number of symbols to which the PSCCH is allocated may be set to be 2 or 3, and the information regarding the number of symbols of the DMRS included in the PSSCH may be set to be 2, 3, or 4. That is, respective construction factors may be determined for the respective sidelink resources in the above-described number range.

In S1230, the transmitting terminal may perform an operation of transmitting the PSCCH and the PSSCH in a single slot using the selected sidelink resource and transmitting the DMRS in a predetermined symbol of the PSSCH on the basis of the predetermined DMRS pattern in S1230.

For example, when the sidelink resource for the transmission of the sidelink data is determined, the transmitting terminal may transmit the PSCCH and the PSSCH in a single slot. The DMRS pattern information included in the PSSCH may be indicated to the receiving terminal as sidelink control information (SCI).

For example, predetermined DMRS pattern information applied to the PSSCH may be indicated by a DMRS pattern filed of the SCI included in the PSCCH. The DMRS pattern filed may be included in first SCI and be determined to be one value from among 1 to 5 bits. Alternatively, the bit value of the DMRS pattern filed may be determined depending on a number value of the DMRS pattern information transmitted by the base station. An SCI format including a DMRS pattern indicator field is SCI 0_1.

The receiving terminal may receive the sidelink data in the PSSCH sidelink resource indicated by the PSCCH and review DMRS symbols allocated in the PSSCH region using the DMRS pattern indicator field.

According to the above-described operations, the transmitting terminal may dynamically configure and transmit the DMRS pattern, and the receiving terminal may receive the PSSCH by reviewing the dynamically-configured DMRS pattern.

Figure 13:
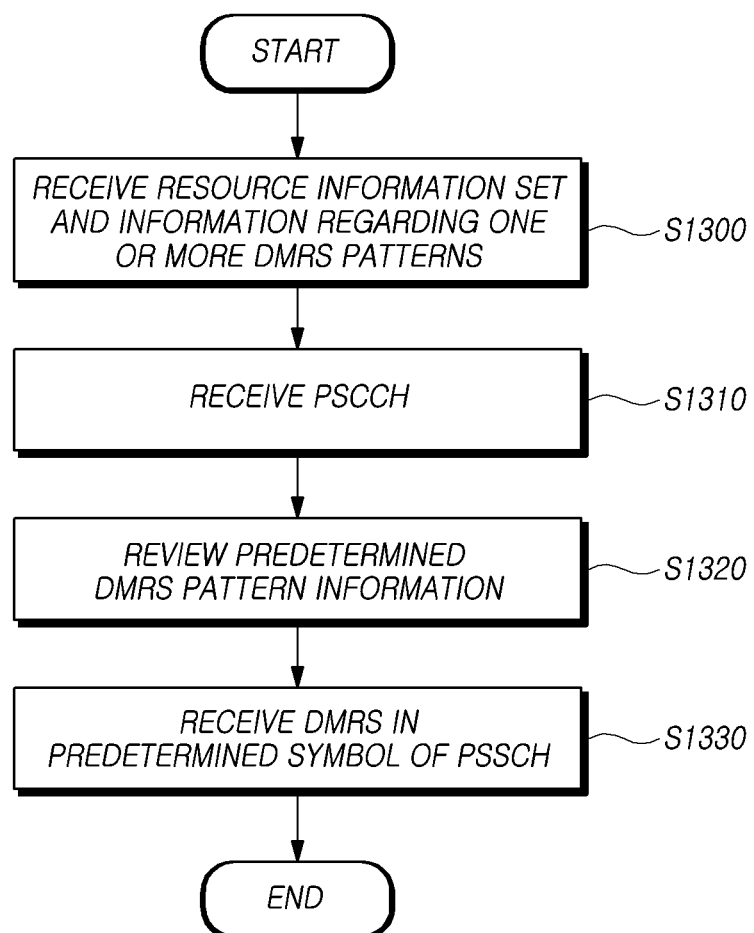
FIG. 13 is a diagram illustrating operations of a receiving terminal according to an embodiment.

FIG. 13 is a diagram illustrating operations of a receiving terminal according to an embodiment.

Referring to FIG. 13, in a method of performing sidelink communications, the receiving terminal may perform an operation of receiving information regarding one or more DMRS patterns and a resource information set including information regarding one or more sidelink resources from the base station in S1300.

The resource information set and the information regarding one or more DMRS patterns may be received by higher layer signaling. For example, the transmitting terminal or the receiving terminal located inside the coverage of the base station receives the resource information set including one or more sidelink resources, to be used for sidelink communication, by RRC signaling. In addition, at least one of the transmitting terminal and the receiving terminal may receive the information regarding one or more DMRS patterns for sidelink communication from the base station. The transmitting terminal and the receiving terminal may respectively configure the resource information set and the DMRS pattern information therein by receiving the same information.

In addition, the information regarding one or more DMRS patterns may be mapped according to the resource information set or sidelink resource. For example, when a first resource information set including one or more pieces of resource information and a second resource information set including one or more pieces of resource information are indicated by the base station, information regarding a single first DMRS pattern for the first resource information set and information regarding a single second DMRS pattern for the second resource information set may be indicated by being mapped to the resource information set. Alternatively, the DMRS pattern information may be indicated by being mapped according to respective sidelink resources included in a single resource information set. Alternatively, the DMRS pattern information may be indicated by being mapped according to two or more sidelink resource sub-sets included in a single resource information set. Alternatively, the DMRS pattern information may be indicated by being mapped to respective groups obtained by grouping two or more resource information sets. In addition, the sidelink resources and the DMRS patterns may be indicated by being mapped in a variety of forms.

In S1310, the receiving terminal may perform an operation of receiving the PSCCH via a single sidelink resource selected by the transmitting terminal.

When the transmitting terminal transmits a sidelink signal by a Mode 2 resource allocation method, the receiving terminal may receive the PSCCH via a single sidelink resource included in the resource information set. Alternatively, the PSCCH may be received via the sidelink resource configured as being default or configured as being dedicated to the sidelink.

In S1320, the receiving terminal may perform an operation of reviewing scheduling information of the PSSCH and predetermined DMRS pattern information, received as being included in the PSSCH, on the basis of PSCCH.

The PSCCH includes sidelink control information (SCI). The SCI may include scheduling information for the PSSCH. The scheduling information may include information indicating frequency and time domain resources for the reception of the PSSCH. In addition, as described above, the SCI may include a DMRS pattern indicator field indicating information regarding a DMRS pattern applied to the PSSCH. That is, the receiving terminal may review the DMRS pattern information, selected by the transmitting terminal, through the PSCCH.

In S1330, the receiving terminal may perform an operation of receiving a DMRS in a predetermined symbol of the PSSCH on the basis of predetermined DMRS pattern information.

For example, the predetermined DMRS pattern information may be indicated by the DMRS pattern filed of the SCI included in the PSCCH.

In addition, the selected predetermined DMRS pattern may be determined on the basis of information regarding consecutive symbols of the sidelink resource selected for the transmission of a PSSCH, information regarding the number of symbols to which a PSCCH is allocated, and information regarding the number of symbols of the DMRS included in the PSSCH. Specifically, when a PSSCH sidelink resource, via which sidelink data is to be transmitted, is selected, information regarding consecutive symbols of the corresponding PSSCH sidelink resource, the number of symbols of the PSCCH allocated in a slot in which the PSSCH is transmitted, and the number of DMRS symbols may be determined. In this case, the position of a symbol, through which the DMRS is to be transmitted, may be determined according to combinations of respective situations, on the basis of previously-configured information in the form of a table. The transmitting terminal may select the predetermined DMRS pattern through the above-described operations, and the receiving terminal may review the same according to the corresponding DMRS pattern information.

For example, the information regarding the number of symbols to which the PSCCH is allocated may be set to be 2 or 3, and the information regarding the number of symbols of the DMRS included in the PSSCH may be set to be 2, 3, or 4. That is, respective construction factors may be determined for the respective sidelink resources in the above-described number range.

For example, the DMRS pattern filed may be included in first SCI and be determined to be one value from among 1 to 5 bits. Alternatively, the bit value of the DMRS pattern filed may be determined depending on a number value of the DMRS pattern information transmitted by the base station. An SCI format including a DMRS pattern indicator field is SCI 0_1.

According to the above-described operations, even when the DMRS pattern in the PSSCH is dynamically changed, the receiving terminal may receive the PSSCH by reviewing the dynamically-changed DMRS pattern.

Hereinafter, a variety of embodiments configuring a DMRS pattern and sharing configuration information in performing sidelink communications that the transmitting terminal and the receiver described above may perform will be described with reference to the accompanying drawings.

FIG. 14 is a diagram illustrating sidelink control information fields according to an embodiment.

Referring to FIG. 14, a transmitting terminal may transmit a PSCCH including sidelink control information (SCI) to a receiving terminal. The SCI may be included in each of the PSCCH and the PSSCH. The SCI transferred by being included in the PSCCH will be described as first SCI or stage 1 SCI, while the SCI transferred by being included in the PSSCH will be described as second SCI or stage 2 SCI.

The first SCI and the second SCI include different SCI. FIG. 14 illustrates example fields of the first SCI.

For example, the first SCI includes a priority field regarding priority, a frequency resource allocation (or assignment) field regarding the PSSCH, and a time resource allocation (or assignment) field. In case of resource reservation, resource reservation period information is included. In addition, the first SCI may include the above-described DMRS pattern indicator field. In addition, the first SCI may include a format field indicating a second SCI format, a beta offset indicator field, a field indicating the number of DMRS ports, and a field indicating modulation and a coding scheme.

Among these, the size of the frequency and resource reservation period field may be variably set. A DMRS pattern field and a second SCI format field may be fixed to predetermined bits or may be variably configured.

The receiving terminal may review the DMRS pattern information by receiving the first SCI illustrated in FIG. 14.

Figure 15:
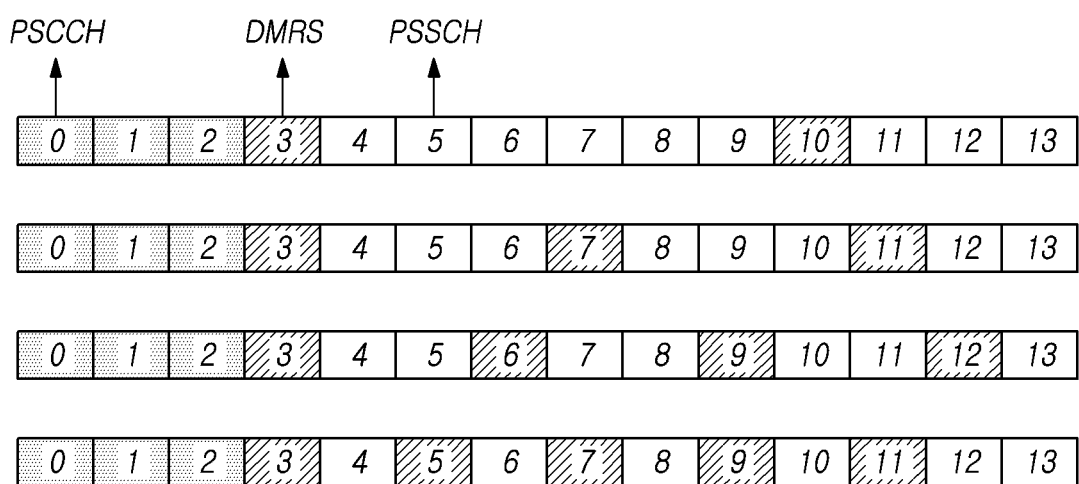
FIG. 15 is a diagram illustrating a pattern in which a PSCCH and a PSSCH are assigned to a single slot and a DMRS is allocated to a variety of symbols.

FIG. 15 is a diagram illustrating a pattern in which a PSCCH and a PSSCH are assigned to a single slot and a DMRS is allocated to a variety of symbols.

Referring to FIG. 15, 14 symbols may be provided in a single sidelink slot. In this case, the PSCCH may be comprised of three symbol regions 0 to 2. Alternatively, the PSCCH may be comprised of two symbol regions with indices 0 and 1. Symbols in the remaining slots except for the PSCCH are allocated to the PSSCH region. The DMRS may be transmitted in some symbols in the PSSCH region.

As described above, DMRS time domain positions are determined by DMRS pattern information. As illustrated in FIG. 15, the number of symbols, to which the DMRS is allocated, included in a single slot may be variably determined.

In addition, in a case in which the slot is comprised of 14 symbols, a pattern in which the DMRS is allocated to the same positions of symbols having symbol indices 0 to 6 and symbols having symbol indices 7 to 13 may be configured. Alternatively, symbols to which the DMRS is allocated may be determined to be symmetrical about the boundary between symbol indices 6 and 7 or to be asymmetrical.

The allocation pattern of the frequency domain of the DMRS will be described as follows.

FIGS. 16 to 19 are diagrams illustrating patterns in a variety of frequency domain in which a DMRS is disposed in a predetermined symbol of a PSSCH according to a DMRS pattern.

Figure 16:
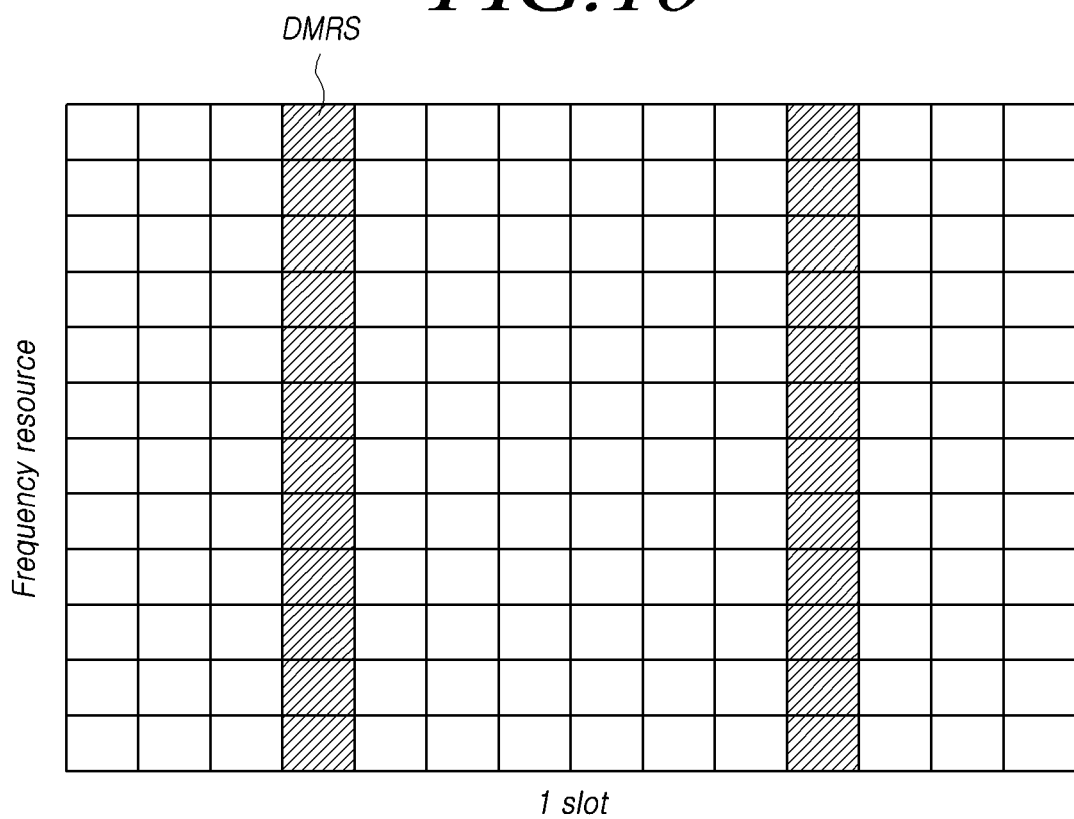
FIGS. 16 to 19 are diagrams illustrating patterns in a variety of frequency domain in which a DMRS is disposed in a predetermined symbol of a PSSCH according to a DMRS pattern.

Referring to FIG. 16, the DMRS may be allocated to all subcarriers of allocated symbols. For example, when two DMRS symbols are allocated in a single slot, the DMRS may be allocated to all subcarriers of the corresponding symbols.

Figure 17:
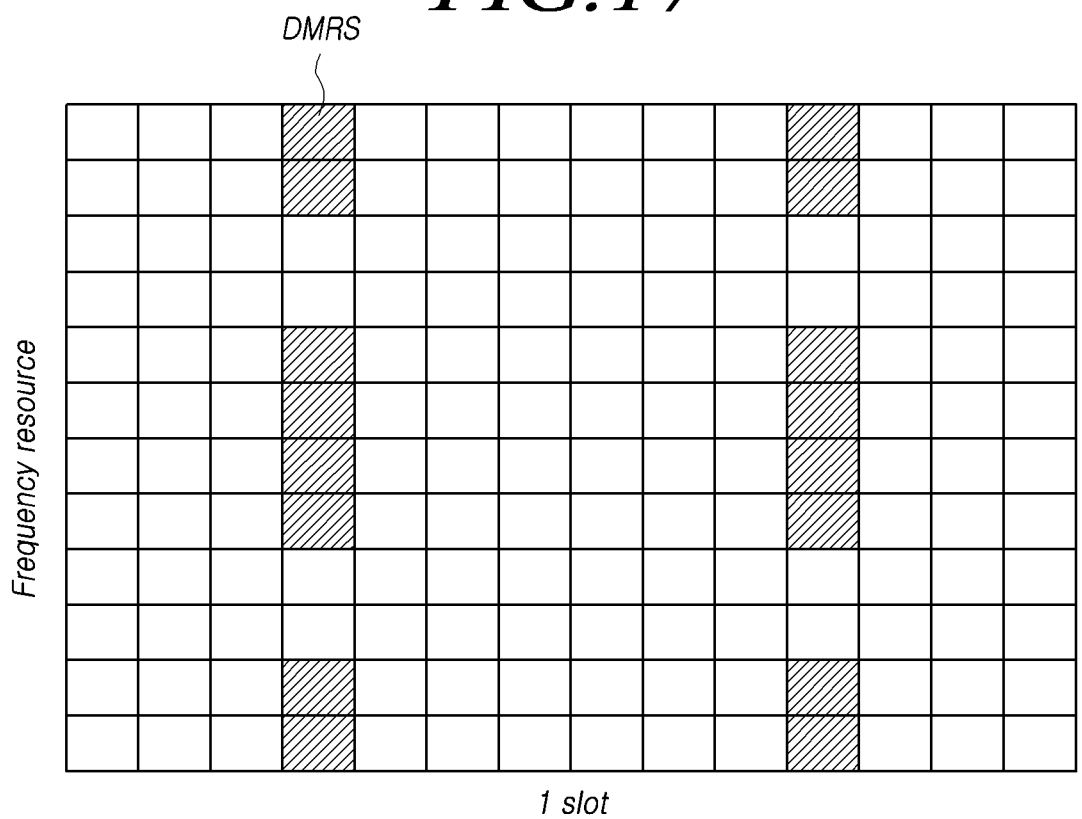

In addition, referring to FIG. 17, the DMRS may be allocated to some subcarriers of allocated symbols. For example, when two DMRS symbols in a single slot are allocated, the DMRS may be allocated to some subcarriers of each of the symbols. A predetermined number of consecutive subcarriers to which the DMRS is allocated and another number of subcarriers to which the DMRS is not allocated may be repeated.

Figure 18:
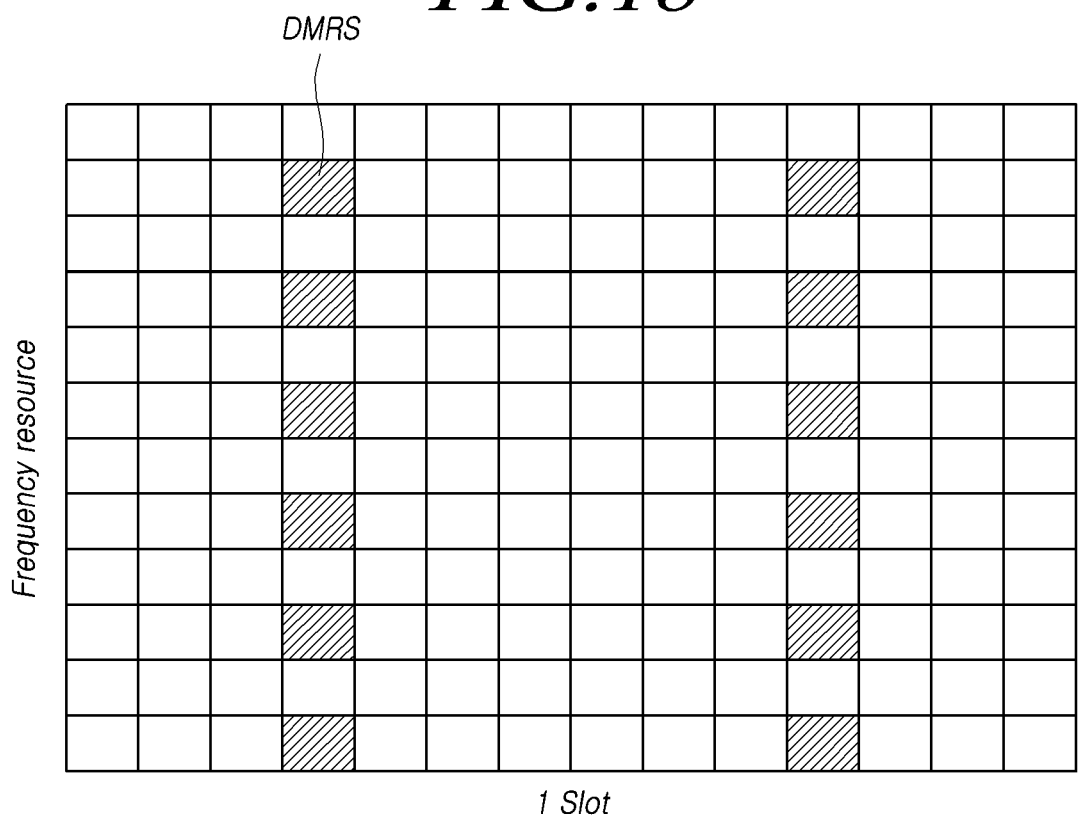
Figure 19:
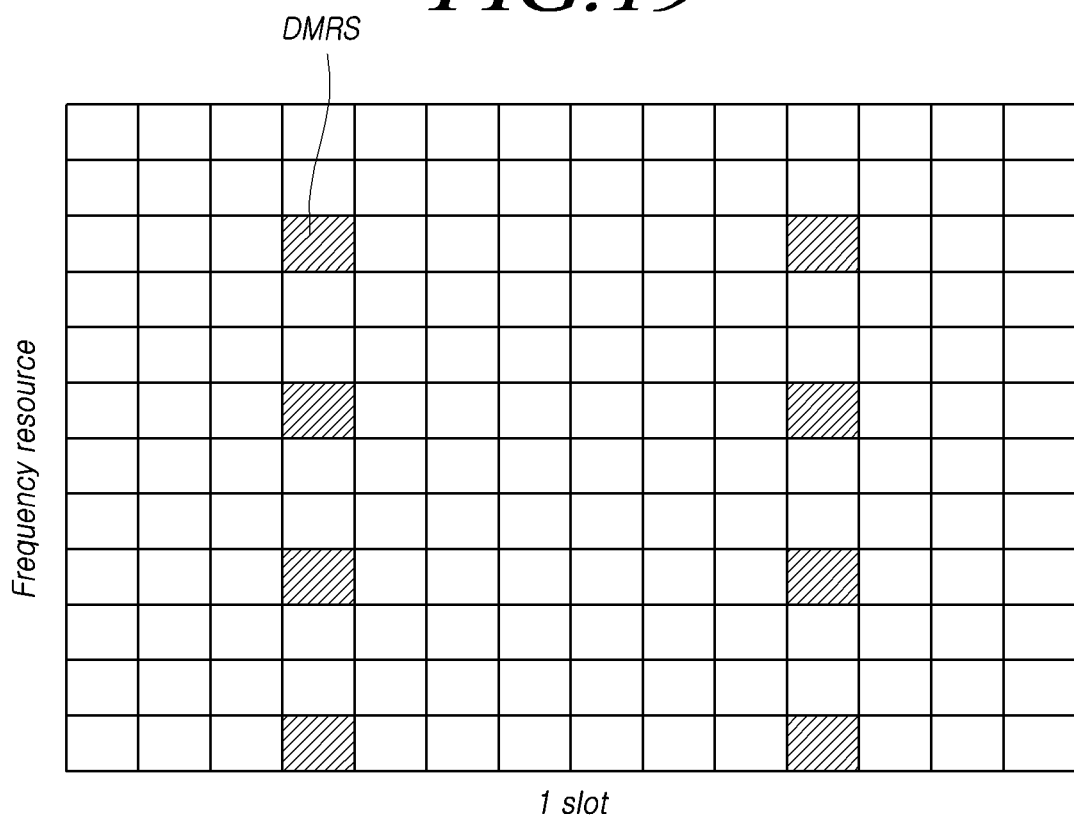

In addition, referring to FIG. 18, the DMRS may be allocated to some subcarriers of allocated symbols. For example, when two DMRS symbols in a single slot are allocated, the DMRS may be allocated with one offset. In this case, a frequency domain DMRS pattern of Comb 1 may be configured. FIG. 19 illustrates a frequency domain DMRS pattern configured to be Comb 2.

In addition, the DMRS pattern may be dynamically configured according to the speed of the sidelink terminal in a single slot. For example, with increases in the speed of the sidelink terminal, the number of symbols to which the DMRS is allocated may be increased or reduced in a single slot.

As described above, one or more DMRS patterns may be mapped in each resource information set. In this case, the transmitting terminal may select resource information for transmission of a sidelink signal, and review an select a DMRS pattern mapped to the resource information. This will be described in more detail with reference to FIG. 20.

FIG. 20 is a diagram illustrating a method of determining DMRS allocation symbols according to an embodiment.

Referring to FIG. 20, a DMRS pattern applied to a PSSCH may be determined on the basis of information regarding consecutive symbols of a sidelink resource selected for PSSCH transmission by the transmitting terminal, information regarding the number of symbols to which a PSCCH is allocated, and information regarding the number of symbols of the DMRS included in the PSSCH.

For example, the consecutive symbol information Ld of the sidelink resource selected for PSSCH transmission by the transmitting terminal may be selected to be one from among 6 to 13. The information regarding the number of symbols to which the PSCCH is allocated may be set to be 2 or 3, while the information regarding the number of symbols of the DMRS included in the PSSCH may be set to be 2, 3, or 4.

In a case in which the transmitting terminal configures the table illustrated in FIG. 20, the number of consecutive symbols of the sidelink resource selected for PSSCH transmission is 10, and two PSCCH symbols are allocated in the corresponding slot, a symbol index L may be appreciated for each of cases in which the numbers of DMRS symbols are 2, 3, and 4. That is, when two DMRS symbols are allocated in a single slot, the DMRS is allocated symbol indices 3 and 8. When three DMRS symbols are allocated in a single slot, the DMRS may be allocated symbol indices 1, 4, and 7. Here, symbol indices may refer to indices allocated to 0 to 13 with respect to the slot. Alternatively, symbol indices may refer to allocated indices, except for symbols in the PSCCH region.

Thus, when the table of FIG. 20 is configured in the transmitting terminal and the receiving terminal in this manner, the DMRS pattern information included in the DMRS pattern indicator field may only include information indicating the number of DMRSs allocated to the PSSCH. That is, since the number of consecutive symbols of the PSSCH and the number of symbols configured with the PSCCH may be reviewed via other fields of sidelink control information (SCI), when the DMRS number information is reviewed, the receiving terminal may review information regarding the symbols, to which the DMRS is allocated, using the table. In this case, the DMRS indicator field may be comprised of 2 bits.

In addition, the DMRS pattern indicator field may be comprised of two subfields. For example, the DMRS pattern indicator field is comprised of subfield A and subfield B, in which field A includes information indicating SCS information of the PSSCH (e.g. 15 kHz: 00, 30 kHz: 01, 60 kHz: 10, and 120 kHz: 11). Field B may include pattern information indicating symbols to which the DMRS is allocated in order to solve a synchronization problem according to the movement speed of the terminal in the SCS determined by field A. For example, field B may be comprised of three bits (e.g. 1:000, 2:001, 3:010, 4:011, and 5:100).

According to the above-described operations, the transmitting terminal and the receiving terminal may communicate with each other by reviewing the DMRS information in the sidelink channel.

In addition, operations of transmitting and receiving a synchronization signal to perform sidelink communication in a case in which synchronization configuration based on the base station is applied will be described.

In sidelink communication, an allocated frequency range may be set to be relatively narrow in a number of cases, unlike the case of the Uu interface. There may be more cases in which information must be transmitted through a broadcast channel. In addition, slot-based transmission of the synchronization signal is required.

Thus, the present disclosure proposes a sidelink synchronization signal block different from the synchronization signal block (SSB) in the Uu interface.

The terminal may perform an operation of receiving the configuration information of the SSB including synchronization information for sidelink communication.

For example, the sidelink synchronization signal block configuration information may include at least one from among subcarrier index information of a frequency domain in which the sidelink synchronization signal block is transmitted, information regarding the number of sidelink synchronization signal blocks transmitted within a single sidelink synchronization signal period, offset information from a start point of the sidelink synchronization signal period to a first sidelink synchronization signal block monitoring slot, and interval information between sidelink synchronization signal block monitoring slots. In an example, the period of the sidelink synchronization signal may be configured to be 16 frames and to be 160 ms. In another example, the period of the sidelink synchronization signal may be configured to be 16 multiples.

In another example, the number of sidelink synchronization signal blocks may be set to be within a differential range according to the subcarrier spacing set to a frequency range in which the sidelink synchronization signal block is transmitted. The subcarrier spacing in the frequency range may be configured to be 15, 30, 60, 120, and 240 kHz, as illustrated in Table 1. Specifically, when the subcarrier spacing is 15 kHz, the number of sidelink synchronization signal blocks is set to be 1 or 2. Alternatively, when the subcarrier spacing is 30 kHz, the number of sidelink synchronization signal block is set to be 1, 2, or 4. Alternatively, when the subcarrier spacing is 60 kHz, the number of sidelink synchronization signal block is set to be one from among 1, 2, 4, and 8. Alternatively, when the subcarrier spacing is 120 kHz, the number of sidelink synchronization signal block is set to be one from among 1, 2, 4, 8, 16, 32, and 64. In addition, in the case of FR2, even when the subcarrier spacing is set to be 60 kHz, the number of sidelink synchronization signal blocks may be set to be one from among 1, 2, 4, 8, 16, and 32.

The terminal may perform an operation of monitoring a configured sidelink synchronization signal block monitoring slot on the basis of the sidelink synchronization signal block configuration information. For example, the terminal monitors a predetermined slot in the period of the sidelink synchronization signal on the basis of the sidelink synchronization signal block configuration information.

For example, when 16 frames are configured in a period of the sidelink synchronization signal, the spacing from a start slot of the period of the sidelink synchronization signal to a first sidelink synchronization signal block monitoring slot of the period of the synchronization signal is reviewed, on the basis of the offset information. In addition, the terminal reviews the spacing from the first sidelink synchronization signal block monitoring slot to a second sidelink synchronization signal block monitoring slot using the interval information. In the same manner, the spacing from the second sidelink synchronization signal block monitoring slot to a third sidelink synchronization signal block monitoring slot is reviewed using the interval information. In addition, the terminal counts the number of the entire sidelink synchronization signal block monitoring slots allocated in the period of the sidelink synchronization signal using the information regarding the number of the sidelink synchronization signal blocks. Thus, the terminal reviews and monitors the index (or position) of the monitoring slot in the period of the sidelink synchronization signal using the sidelink synchronization signal block configuration information.

The terminal may perform an operation of receiving the sidelink synchronization signal block in the sidelink synchronization signal block monitoring slot. For example, the terminal receives the sidelink synchronization signal block in the monitoring slot using the above-described sidelink synchronization signal block configuration information. The sidelink synchronization signal block is comprised of a sidelink primary synchronization signal (S-PSS), a sidelink secondary synchronization signal (S-SSS), and a physical sidelink broadcast channel (PSBCH). The S-PSS, the S-SSS, and the PSBCH may be allocated to N number of consecutive symbols in the sidelink synchronization signal block monitoring slot.

The sidelink synchronization signal block may be allocated to N number of consecutive symbols in the sidelink synchronization signal block monitoring slot. In this case, the sidelink synchronization signal block may be comprised of two S-PSSs, two S-SSSs, and N−4 number of PSBCH symbols. For example, the sidelink synchronization signal block may be allocated with the PSBCH at symbol index 0 in the sidelink synchronization signal block monitoring slot. In addition, the sidelink synchronization signal block may be allocated with the S-PSS at symbol indices 1 and 2, the S-SSS at symbol indices 3 and 4, and the PSBCH at symbol indices 5 to N−1. In this case, when the sidelink synchronization signal block monitoring slot is a normal cyclic prefix (CP), N is 13. When the sidelink synchronization signal block monitoring slot is an extended CP, N is 11. That is, when a single slot is comprised of 14 or 12 symbols, the sidelink synchronization signal block may be configured by excluding the last symbol and allocating the S-PSS, the S-SSS, and the PSBCH. In another example, the sidelink synchronization signal block may be comprised of 132 subcarriers.

In addition, also in sidelink communication, an HARQ operation may be performed. However, there is a problem in that the HARQ operation frequently performed in sidelink communications causes the overlapping of resources and increased system load. In addition, the HARQ operation may not be properly performed due to the limited transmission power of the terminal.

Therefore, hereinafter, an HARQ operation of the terminal will be proposed.

In a method of controlling a sidelink HARQ feedback operation, the terminal may perform an operation of receiving group-cast sidelink data from the transmitting terminal through the physical sidelink shared channel (PSSCH). For example, the terminal receives the PSCCH and the PSSCH from the transmitting terminal. Sidelink communication may support unicast communication between terminals, groupcast communication between a single transmitting terminal and plurality of receiving terminals in a group, and broadcast communication in which a single transmitting terminal performs broadcasting. In the case of groupcast communication, the PSCCH may include scheduling information regarding a PSSCH wireless resource including sidelink groupcast data. The terminal receives the PSSCH including groupcast sidelink data on the basis of the SCI included in the PSCCH.

The terminal may perform an operation of determining whether or not to transmit HARQ feedback information of the groupcast sidelink data on the basis of position information of the transmitting terminal. For example, the position information of the transmitting terminal may be included in sidelink control information (SCI) received through the PSSCH and include zone ID information of the transmitting terminal. The SCI received through the PSSCH may mean second SCI. That is, the SCI received through the PSSCH is separated from the SCI including the scheduling information regarding the groupcast sidelink data and received through the PSCCH. For example, the SCI received through the PSSCH may include HARQ process ID information, new data command information, redundancy version information, transmitting terminal ID information, receiving terminal ID information, CSI request information, zone ID information, and communication range request information. In addition, geographic position information mapped according to the zone ID information may be received from the base station by higher layer signaling. The terminal may obtain the position information of the transmitting terminal using the geographic position information according to the zone ID information received from the base station and the zone ID information of the transmitting terminal.

In addition, the HARQ feedback information may be determined on the basis of information regarding a distance calculated according to the position of the transmitting terminal and the position of the terminal and whether or not the decoding of the groupcast sidelink data has succeeded. In an example, only when the decoding of the groupcast sidelink data has failed and the distance information is equal to or less than a predetermined threshold value, it may be determined to transmit the HARQ feedback information. Here, the HARQ feedback information may include HARQ-NACK information. In another example, when the distance information is equal to or greater than the predetermined threshold value, it may be determined to transmit the HARQ feedback information including HARQ-ACK or HARQ-NACK information depending on whether or not the decoding of the groupcast sidelink data has succeeded. In a further example, when the decoding of the groupcast sidelink data has succeeded, it may be determined not to transmit the HARQ feedback information irrespective of the distance information. In yet another example, only when the decoding of the groupcast sidelink data has failed, it may be determined whether or not to transmit the HARQ feedback information on the basis of the distance information.

The above-described transmission of the HARQ feedback information may be only performed when the sidelink HARQ feedback operation is activated. That is, the sidelink HARQ feedback operation may be activated or deactivated, and whether to activate or deactivate the sidelink HARQ feedback operation may be determined by a command from the base station or the transmitting terminal. In addition, the above-described threshold value may be included in the SCI received through the PSSCH (as, for example, communication range request information) or may be provided in the terminal by the base station.

When it is determined to transmit the HARQ feedback information, the terminal may perform an operation of transmitting the HARQ feedback information. For example, when it is determined to transmit the HARQ feedback information, the terminal may transmit the HARQ feedback information regarding the groupcast sidelink data.

The above-described operations provide effects that unnecessary sidelink system load may be reduced and the HARQ feedback operation based on the distance information between the transmitting terminal and the terminal may be performed.

Figure 21:
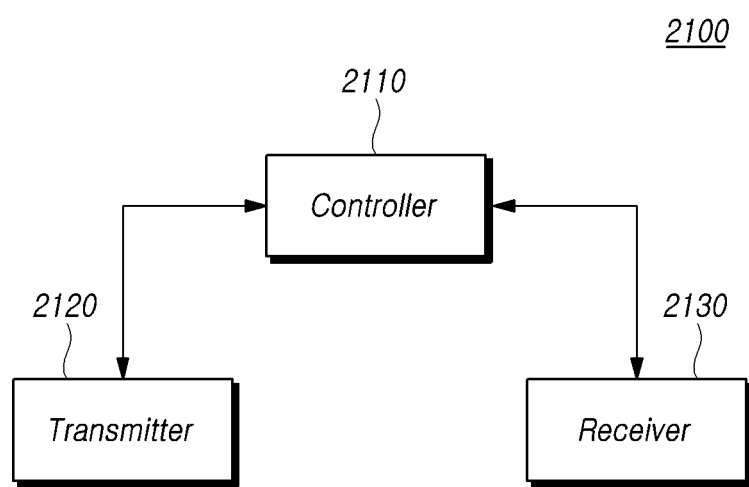
FIG. 21 is a diagram illustrating a configuration of a transmitting terminal according to an embodiment.

FIG. 21 is a diagram illustrating a configuration of a transmitting terminal according to an embodiment.

Referring to FIG. 21, a transmitting terminal 2100 may include a receiver 2130, a controller 2110, and a transmitter 2120. The receiver 2130 receives information regarding one or more DMRS patterns and a resource information set including information regarding one or more sidelink resources from a base station. The controller 2110 selects a single sidelink resource, via which sidelink communication is to be performed, on the basis of the resource information set, and selects a predetermined DMRS pattern from the information regarding one or more DMRS patterns, on the basis of the selected sidelink resource. The transmitter 2120 transmits a PSCCH and a PSSCH in a single slot using the selected sidelink resource, and transmits a DMRS in a predetermined symbol of the PSSCH on the basis of the predetermined DMRS pattern.

The receiver 2130 may include the resource information set and the information regarding one or more DMRS patterns by higher layer signaling. For example, the transmitting terminal 2100 or a receiving terminal located in the coverage of the base station receives the resource information set including one or more sidelink resources, to be used in sidelink communication, by RRC signaling. In addition, at least one of the transmitting terminal 2100 and the receiving terminal may receive the information regarding one or more DMRS patterns for sidelink communication from the base station. The transmitting terminal 2100 and the receiving terminal may configure the resource information set and the DMRS pattern information therein by receiving the same information.

In addition, the information regarding one or more DMRS patterns may be mapped according to the resource information set or the sidelink resources. For example, when a first resource information set including one or more pieces of resource information and a second resource information set including one or more pieces of resource information are indicated by the base station, information regarding a single first DMRS pattern for the first resource information set and information regarding a single second DMRS pattern for the second resource information set may be indicated by being mapped to the resource information set. Alternatively, the DMRS pattern information may be indicated by being mapped according to respective sidelink resources included in a single resource information set. Alternatively, the DMRS pattern information may be indicated by being mapped according to two or more sidelink resource sub-sets included in a single resource information set. Alternatively, the DMRS pattern information may be indicated by being mapped to respective groups obtained by grouping two or more resource information sets. In addition, the sidelink resources and the DMRS patterns may be indicated by being mapped in a variety of forms. The controller 2110 configures the received resource information set and the received DMRS pattern in the terminal.

When sidelink communication is triggered, the controller 2110 selects a predetermined sidelink resource from the configured resource information set. A method by which the controller 2110 selects the predetermined sidelink resource from the configured resource information set for sidelink communication may be performed according to a variety of standards. For example, the controller 2110 may select the predetermined sidelink resource according to priorities allocated to a plurality of sidelink resources. Alternatively, the controller 2110 may detect whether or not each of the plurality of sidelink resources is used and select a sidelink resource having a detection result value equal to or smaller than a reference value. That is, the controller 2110 may select a sidelink resource to use by detecting sidelink resources, each of which is not used or is used less.

In addition, when a single sidelink resource is selected, the controller 2110 may select a DMRS pattern configured by being mapped to the selected sidelink resource. Alternatively, the controller 2110 may select the DMRS pattern on the basis of property information of the selected sidelink resource.

For example, the selected predetermined DMRS pattern may be determined on the basis of information regarding consecutive symbols of a sidelink resource selected for transmission of a physical sidelink shared channel (PSSCH), information regarding the number of symbols to which a physical sidelink control channel (PSCCH) is allocated, and information regarding the number of symbols of a DMRS included in the PSSCH. Specifically, when a PSSCH sidelink resource, via which sidelink data is to be transmitted, is selected, information regarding consecutive symbols of the corresponding PSSCH sidelink resource, the number of symbols of the PSCCH allocated in a slot in which the PSSCH is transmitted, and the number of DMRS symbols may be determined. In this case, the position of a symbol, through which the DMRS is to be transmitted, may be determined according to combinations of respective situations, on the basis of previously-configured information in the form of a table.

For example, the information regarding the number of symbols to which the PSCCH is allocated may be set to be 2 or 3, and the information regarding the number of symbols of the DMRS included in the PSSCH may be set to be 2, 3, or 4. That is, respective construction factors may be determined for the respective sidelink resources in the above-described number range. In this case, the controller 2110 may control the DMRS pattern to be indicated to the receiving terminal by setting the DMRS pattern indicator field to only include the information regarding the number of PSSCH DMRS symbols.

In addition, the controller 2110 may control the operation of the transmitting terminal 2110 required for performing the foregoing embodiments.

In addition, the transmitter 2120 and the receiver 2130 serve to transmit and receive signals, data, and messages to and from the base station and the receiving terminal through the corresponding channels.

Embodiments of the present disclosure may be supported by standard documents of at least one of the IEEE 802 system, the 3GPP system, and the 3GPP2 system, all of which are wireless access systems. That is, steps, components, or portions not described in embodiments of the present disclosure for the sake of clearly describing the spirit of the present disclosure may be supported by the standard documents. For all terms used herein, reference may be made to the standard documents.

Embodiments of the present disclosure may be implemented using a variety of means. For example, embodiments of the present disclosure may be implemented using hardware, firmware, software, or any combination thereof.

In the case in which the present disclosure is implemented using hardware, the methods according to embodiments of the present disclosure may be realized using one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present disclosure is implemented using firmware or software, the methods according to embodiments of the present disclosure may be implemented in the form of devices, processes, functions, or the like performing the functions or operations described above. Software codes may be stored in a memory unit so as to be executed by a processor. The memory unit may be located inside or outside of the processor and may exchange data with the processor via a variety of known means.

The terms, such as "system", "processor", "controller", "component", "module", "interface", "model", or "unit", used herein may generally refer to computer-related entity hardware, a combination of hardware and software, software, or software in execution. For example, the above-described components may be at least one selected from among, but not limited to, a process, a processor, a controller, a control processor, an entity, an execution thread, a program, and a computer. For example, both an application being executed by the controller or processor and the controller or processor may be a component. One or more components may reside in at least one of a process and an execution thread. A component may be located in a single device (e.g. a system or a computing device) or may be distributed between two or more devices.

The foregoing descriptions have been presented in order to explain certain principles of the present disclosure by way of example. Those having ordinary knowledge in the technical field to which the present disclosure relates could make various modifications and variations without departing from the essential features of the principle of the present disclosure. In addition, the foregoing embodiments shall be interpreted as being illustrative, while not being limitative, of the principle and scope of the present disclosure. It should be understood that the scope of protection of the present disclosure shall be defined by the appended Claims and all of their equivalents fall within the scope of protection of the present disclosure.

The invention claimed is:

1. A method of performing sidelink communication by a transmitting terminal, the method comprising:
receiving information regarding one or more DMRS patterns from a base station;
selecting a predetermined DMRS pattern from the information regarding one or more DMRS patterns; and
transmitting a DMRS in a predetermined symbol of a PSSCH in accordance with the predetermined DMRS pattern,
wherein a DMRS time domain position is determined by the one or more DMRS patterns,
wherein the predetermined DMRS pattern is determined in accordance with i) information regarding consecutive symbols of a sidelink resource selected for transmission of the PSSCH, ii) information regarding the number of symbols to which a PSCCH is allocated, and iii) information regarding the number of symbols of the DMRS included in the PSSCH.

2. The method according to claim 1, wherein the information regarding one or more DMRS patterns is received by higher layer signaling, and the information regarding one or more DMRS patterns is mapped according to a resource information set or the sidelink resources.

3. The method according to claim 1, wherein information regarding the predetermined DMRS pattern is indicated by a DMRS pattern filed of a sidelink control information.

4. The method according to claim 1, wherein the information regarding the number of symbols to which the PSCCH is allocated is 2 or 3, and
the information regarding the number of symbols of the DMRS included in the PSSCH is set to be 2, 3, or 4.

5. A method of performing sidelink communication by a receiving terminal, the method comprising:
receiving information regarding one or more DMRS patterns from a base station;
receiving a PSCCH via a sidelink resource selected by a transmitting terminal;
reviewing scheduling information of a PSSCH and information regarding a predetermined DMRS pattern received by being included in the PSSCH, in accordance with the PSCCH; and
receiving a DMRS in a predetermined symbol of the PSSCH in accordance with the information regarding a predetermined DMRS pattern,
wherein a DMRS time domain position is determined by the one or more DMRS patterns,
wherein the predetermined DMRS pattern is determined in accordance with i) information regarding consecutive symbols of a sidelink resource selected for transmission of the PSSCH, ii) information regarding the number of symbols to which the PSCCH is allocated, and iii) information regarding the number of symbols of a DMRS included in the PSSCH.

6. The method according to claim 5, wherein the information regarding one or more DMRS patterns is received by higher layer signaling, and
the information regarding one or more DMRS patterns is mapped according to a resource information set or a sidelink resources.

7. The method according to claim 5, wherein the information regarding a predetermined DMRS pattern is indicated by a DMRS pattern filed of a sidelink control information included in the PSCCH.

8. The method according to claim 5, wherein the information regarding the number of symbols to which the PSCCH is allocated is 2 or 3, and
the information regarding the number of symbols of the DMRS included in the PSSCH is set to be 2, 3, or 4.

9. A transmitting terminal performing sidelink communication, the transmitting terminal comprising:
a receiver receiving information regarding one or more DMRS patterns from a base station;
a controller selecting a predetermined DMRS pattern from the information regarding one or more DMRS patterns; and
a transmitter transmitting a DMRS in a predetermined symbol of a PSSCH in accordance with the predetermined DMRS pattern,
wherein a DMRS time domain position is determined by the one or more DMRS patterns,
wherein the predetermined DMRS pattern is determined in accordance with i) information regarding consecutive symbols of a sidelink resource selected for transmission of the PSSCH, ii) information regarding the number of symbols to which a PSCCH is allocated, and iii) information regarding the number of symbols of the DMRS included in the PSSCH.

10. The transmitting terminal according to claim 9, wherein the information regarding one or more DMRS patterns is received by higher layer signaling, and
the information regarding one or more DMRS patterns is mapped according to a resource information set or the sidelink resources.

11. The transmitting terminal according to claim 9, wherein information regarding the predetermined DMRS pattern is indicated by a DMRS pattern filed of a sidelink control information.

12. The transmitting terminal according to claim 9, wherein the information regarding the number of symbols to which the PSCCH is allocated is 2 or 3, and
the information regarding the number of symbols of the DMRS included in the PSSCH is set to be 2, 3, or 4.

* * * * *